(12) United States Patent
Hattori

(10) Patent No.: US 11,840,011 B2
(45) Date of Patent: Dec. 12, 2023

(54) IMPRINT APPARATUS, IMPRINT METHOD, AND METHOD OF MANUFACTURING ARTICLE

(71) Applicant: CANON KABUSHIKI KAISHA, Tokyo (JP)

(72) Inventor: Tadashi Hattori, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/718,463

(22) Filed: Apr. 12, 2022

(65) Prior Publication Data
US 2022/0332035 A1     Oct. 20, 2022

(30) Foreign Application Priority Data

Apr. 20, 2021   (JP) .................. 2021-071333

(51) Int. Cl.
| | | |
|---|---|---|
| *B29C 59/02* | (2006.01) | |
| *B29C 59/00* | (2006.01) | |
| *B29C 33/42* | (2006.01) | |
| *B29L 31/34* | (2006.01) | |
| *B29C 37/00* | (2006.01) | |

(52) U.S. Cl.
CPC ............ *B29C 59/02* (2013.01); *B29C 33/424* (2013.01); *B29C 59/002* (2013.01); *B29C 2037/90* (2013.01); *B29L 2031/34* (2013.01)

(58) Field of Classification Search
CPC ..... B29C 59/02; B29C 33/424; B29C 59/002; B29C 2037/90; B29C 43/58; B29C 43/02; B29C 33/42; H01L 21/02
See application file for complete search history.

(56) References Cited

U.S. PATENT DOCUMENTS

| | | | |
|---|---|---|---|
| 7,658,601 B2 | 2/2010 | Kasumi | |
| 10,421,219 B2 | 9/2019 | Hattori | |
| 2010/0169042 A1* | 7/2010 | Aritsuka | ............ B81C 99/0065 702/167 |
| 2016/0193759 A1* | 7/2016 | Hattori | .................. G03F 7/0002 425/141 |

FOREIGN PATENT DOCUMENTS

| | | |
|---|---|---|
| JP | 2005101201 A | 4/2005 |
| JP | 6497938 B2 | 4/2019 |

* cited by examiner

*Primary Examiner* — Galen H Hauth
*Assistant Examiner* — Shibin Liang
(74) *Attorney, Agent, or Firm* — ROSSI, KIMMS & McDOWELL LLP

(57) ABSTRACT

An imprint apparatus executes an imprint process for shaping an imprint material by using a mold. The apparatus includes a controller which obtains first height distribution information indicating a height distribution of a surface of a first substrate, and a measuring device which obtains second height distribution information indicating a height distribution of a surface of a second substrate. The controller controls the imprint process based on corrected height distribution information which is obtained by removing a first component that is an approximation function, of an order not more than a first predetermined order, for approximating the first height distribution information, from the first height distribution information, and a second component which is an approximation function, of an order not more than a second predetermined order, for approximating the second height distribution information.

12 Claims, 15 Drawing Sheets

IMPRINT APPARATUS, IMPRINT METHOD, AND METHOD OF MANUFACTURING ARTICLE

BACKGROUND OF THE INVENTION

Field of the Invention

The present invention relates to an imprint apparatus, an imprint method, and a method of manufacturing an article.

Description of the Related Art

In an imprint apparatus, a pattern of a mold is transferred to an imprint material by curing the imprint material in a state in which the imprint material arranged on a substrate is in contact with the mold. In a nanoimprint apparatus, it is important to bring the mold and the imprint material on the substrate in a state in which the substrate and the mold are parallel to each other. FIGS. 2A and 2B show an exaggerated view of a state in which a mold 3 and an imprint material 14 on a shot region 20 of a substrate 5 are brought into contact with each other in a state in which the substrate 5 and the mold 3 are not parallel. Due to the fact that the substrate 5 and the mold 3 are not parallel, a region 21 of the substrate 5 is not filled with the imprint material 14, and the imprint material 14 has overflowed to the outside of the shot region 20 in another region 22. The fact that the substrate 5 and the mold 3 are not parallel can cause the thickness of the imprint material 14 to be nonuniform. This can have a negative effect, such as the degradation of linewidth uniformity, and reduce the yield. In addition, the fact that the interval between the substrate 5 and the mold 3 is not the target interval can also cause the thickness of the imprint material 14 to deviate from the target thickness. This can also have a negative effect, such as the degradation of linewidth uniformity, and reduce the yield.

Japanese Patent Laid-Open No. 2005-101201 discloses that, in a nanoimprint apparatus which transfers a pattern by pressing a mold onto an object to be processed, control is executed so that a pressing direction of the mold will be maintained in a perpendicular direction with respect to a pattern formation surface of the mold.

If the shape of the surface of the substrate can be specified, the tilt and/or the height of the substrate in a shot region of the substrate can be obtained, thereby allowing the relative tilt and/or the relative interval between the shot region and the mold to be obtained. The surface of the substrate can have, for example, the shape of a surface of the second order. To obtain an approximation function that shows the shape of the surface of the second order, the height of the surface of the substrate needs to be measured at at least six measurement points. To improve the accuracy of the approximation, it is preferable to use the least squares method to determine the approximation function by, for example, setting the number of measurement point to be seven to ten points. However, since increasing the number of measurement points time will accordingly prolong the time required for the measurement, it can reduce the throughput. On the other hand, since decreasing the number of measurement points will prevent the shape of the surface of the substrate from being measured accurately, it will be impossible to accurately obtain the tilt of the shot region. Furthermore, since the surface of the substrate may have a shape of an order higher than a quadratic function, an even longer time will be needed to determine an approximation function of a higher order.

SUMMARY OF THE INVENTION

The present invention provides a technique advantageous in improving the yield and the throughput by accurately measuring the shape of the surface of the substrate in a short time.

One of aspects of the present invention provides an imprint apparatus that executes an imprint process for shaping an imprint material by using a mold, comprising: a controller configured to obtain first height distribution information indicating a height distribution of a surface of a first substrate; and a measuring device configured to obtain second height distribution information indicating a height distribution of a surface of a second substrate, wherein the controller is further configured to control the imprint process based on corrected height distribution information which is obtained by removing a first component that is an approximation function, of an order not more than a first predetermined order, for approximating the first height distribution information, from the first height distribution information, and a second component which is an approximation function, of an order not more than a second predetermined order, for approximating the second height distribution information.

Further features of the present invention will become apparent from the following description of exemplary embodiments with reference to the attached drawings.

DESCRIPTION OF THE EMBODIMENTS

Figure 1:
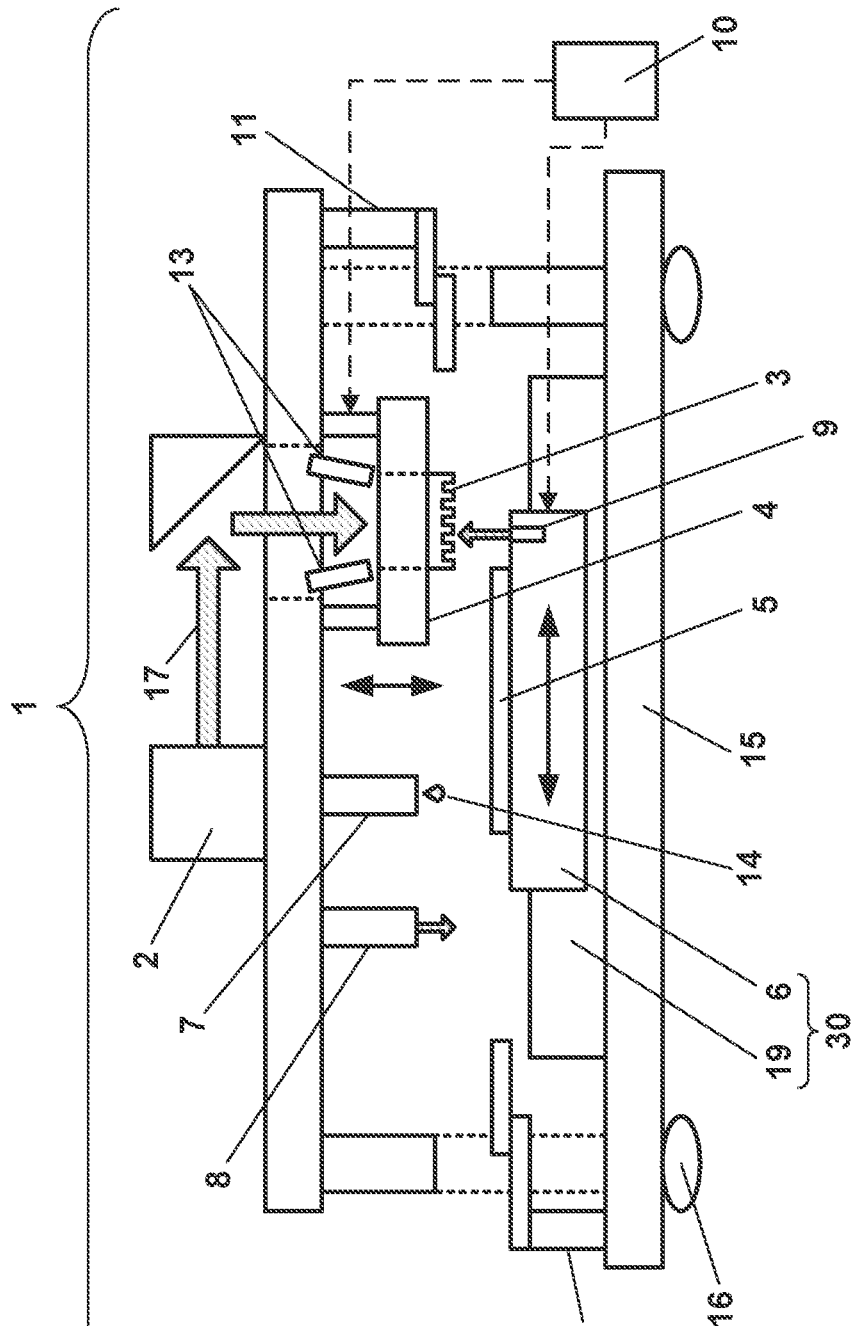
FIG. 1 is a view showing the arrangement of an imprint apparatus according to an embodiment.
Figure 2A:
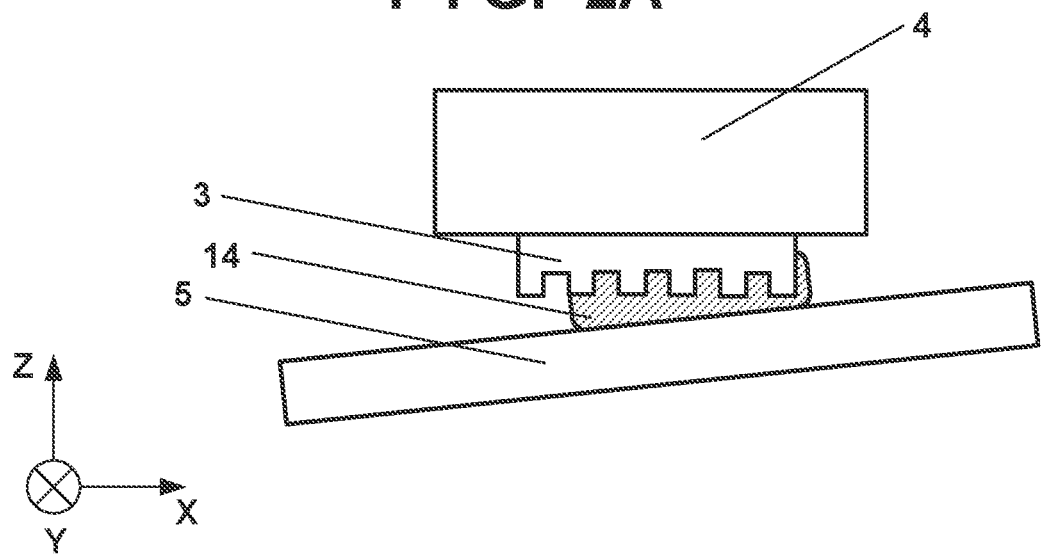
FIGS. 2A and 2B are views showing an exaggerated view of a state in which an imprint process is performed when a substrate and a mold are not parallel to each other.
Figure 2B:
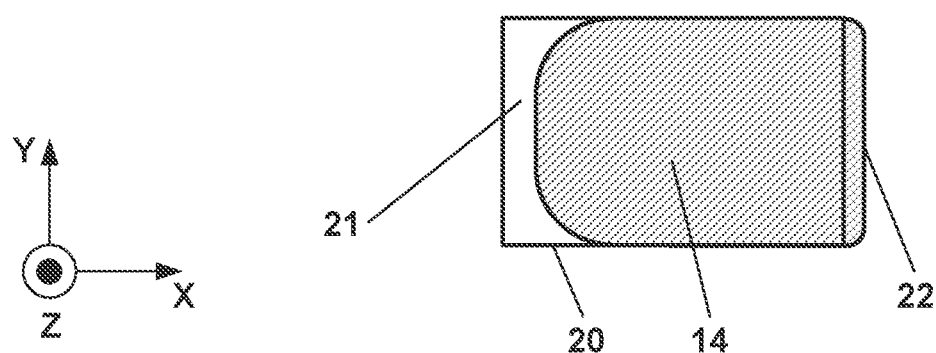

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 shows the arrangement of an imprint apparatus 1. The imprint apparatus 1 can be formed to execute an imprint process that uses a mold to shape an imprint material on the substrate. As the imprint material, a curable composition (to be also referred to a resin in an uncured state) to be cured by receiving curing energy is used. As the curing energy, an electromagnetic wave or heat can be used. The electromagnetic wave can be, for example, light selected from the wavelength range of 10 nm or more to 1 mm or less, for example, infrared light, a visible light beam, or ultraviolet light. The curable composition can be a composition cured by light irradiation or heating. Among compositions, a photo-curable composition cured by light irradiation contains at least a polymerizable compound and a photopolymerization initiator, and may further contain a nonpolymerizable compound or a solvent, as needed. The nonpolymerizable compound is at least one material selected from the group consisting of a sensitizer, a hydrogen donor, an internal mold release agent, a surfactant, an antioxidant, and a polymer component. The imprint material can be arranged on the substrate in the form of droplets or in the form of an island or film formed by connecting a plurality of droplets. The imprint material can be supplied as a film onto the substrate by a spin coater or a slit coater. The viscosity (the viscosity at 25° C.) of the imprint material can be, for example, 1 mPa·s or more to 100 mPa·s or less. As the material of the substrate, for example, glass, a ceramic, a metal, a semiconductor, a resin, or the like can be used. A member made of a material different from the substrate may be provided on the surface of the substrate, as needed. The substrate is, for example, a silicon wafer, a compound semiconductor wafer, or silica glass.

In the specification and the accompanying drawings, directions will be indicated on an XYZ coordinate system in which directions parallel to the surface of a substrate 5 are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are θX, θY, and θZ, respectively. Control or driving concerning the X-axis, the Y-axis, and the Z-axis means control or driving concerning a direction parallel to the X-axis, a direction parallel to the Y-axis, and a direction parallel to the Z-axis, respectively. In addition, control or driving concerning the θX-axis, the θY-axis, and the θZ-axis means control or driving concerning a rotation about an axis parallel to the X-axis, a rotation about an axis parallel to the Y-axis, and a rotation about an axis parallel to the Z-axis, respectively. In addition, a position is information that can be specified based on coordinates on the X-, Y-, and Z-axes, and an orientation is information that can be specified by values on the θX-, θY-, and θZ-axes. Positioning means controlling the position and/or orientation. Alignment can include controlling the position and/or orientation of at least one of the substrate 5 and a mold 3 so as to reduce an alignment error (overlay error) between a shot region of the substrate 5 and a pattern region of the mold 3. In addition, alignment can include control for correcting or changing the shape of at least one of the shot region of the substrate 5 and the pattern region of the mold 3.

The imprint apparatus 1 can include, for example, a curing unit 2, an imprint head 4, a substrate positioning mechanism 30, a dispenser 7, a mold conveyance mechanism 11, a substrate conveyance mechanism 12, a TTM (Through The Mask) scope 13, and a controller 10. In addition, the imprint apparatus 1 can include a mold height sensor 9 and a substrate height sensor (measuring device) 8.

The curing unit 2 cures an imprint material 14 arranged on the substrate 5 by irradiating the imprint material 14 with a curing energy (for example, light such as ultraviolet light) 17 via the mold 3. The imprint head 4 is a mold driving mechanism that holds and drives the mold 3. The mold 3 includes a pattern region, and a pattern to be transferred onto the imprint material 14 on the substrate 5 is formed in the pattern region. The imprint head 4 can be formed to drive the mold 3 about a plurality of axes (for example, three axes including the Z-axis, θX-axis, and θY-axis, and more preferably six axes including the X-axis, Y-axis, Z-axis, θX-axis, θY-axis, and θZ-axis). Driving about the θX-axis and the θY-axis represents controlling of the tilt of the mold 3 or its pattern region.

The TTM scope 13 can be arranged on the imprint head 4. The TTM scope 13 can be formed to observe or measure alignment marks arranged on the substrate 5 and alignment marks formed on the mold 3. The TTM scope 13 can include, for example, an optical system and an image capturing system. The TTM scope 13 can measure an alignment error (for example, a shift amount in the X direction and the Y direction) between the shot region of the substrate 5 and (the pattern region of) the mold 3.

The substrate positioning mechanism 30 can include a substrate stage 6 that holds the substrate 5 and a stage driving mechanism 19 that drives the substrate stage 6. The substrate stage 6 can be driven about a plurality of axes (for example, three axes including the X-axis, Y-axis, and θZ-axis, and more preferably, six axes including the X-axis, Y-axis, Z-axis, θX-axis, θY-axis, and θZ-axis) by the stage driving mechanism 19. As a result, the substrate 5 can be driven or be positioned about a plurality of axes.

The substrate stage 6 can incorporate the mold height sensor 9 for measuring the height or the tilt of the pattern region of the mold 3. The height of each of a plurality of measurement points of (the pattern region of) the mold 3 can be measured by the mold height sensor 9 while driving the substrate stage 6 along an X-Y plane, and the tilt or the shape of (the pattern region of) the mold 3 can be measured based on the obtained measurement results. The substrate stage 6 can be driven along a stage plate 15 by the stage driving mechanism 19. The stage plate 15 can be supported by a stage plate mount 16 so as to be isolated from the vibration from the floor. In addition to the stage plate 15, the curing unit 2, the imprint head 4, the dispenser 7, the substrate height sensor 8, and the like are also supported by the stage plate mount 16 in the imprint apparatus 1 of the arrangement example shown in FIG. 1.

The substrate height sensor 8 can be used to measure the height distribution or the shape of the surface of the substrate 5. The height of each of a plurality of measurement points of the substrate 5 can be measured by the substrate height sensor 8 while the substrate stage 6 is driven in the X-Y direction, and the height distribution or the shape of the surface of the substrate 5 can be measured based on the obtained measurement results.

The dispenser 7 can be formed to supply or arrange the uncured imprint material 14 onto the substrate 5. The mold conveyance mechanism 11 can convey the mold 3 to the imprint head 4 and convey the mold 3 from the imprint head 4. The substrate conveyance mechanism 12 can convey the substrate 5 to the substrate stage 6 and convey the substrate 5 from the substrate stage 6. The controller 10 can be formed by, for example, a PLD (the abbreviation of a Programmable Logic Device) such as an FPGA (the abbreviation of a Field Programmable Gate Array), an ASIC (the abbreviation of an Application Specific Integrated Circuit), a general-purpose computer embedded with a program or a combination of all or some of these components. The controller 10 can be formed to control the curing unit 2, the imprint head 4, a substrate positioning mechanism 30, the dispenser 7, the mold conveyance mechanism 11, the substrate conveyance mechanism 12, and the TTM scope 13.

Figure 3:
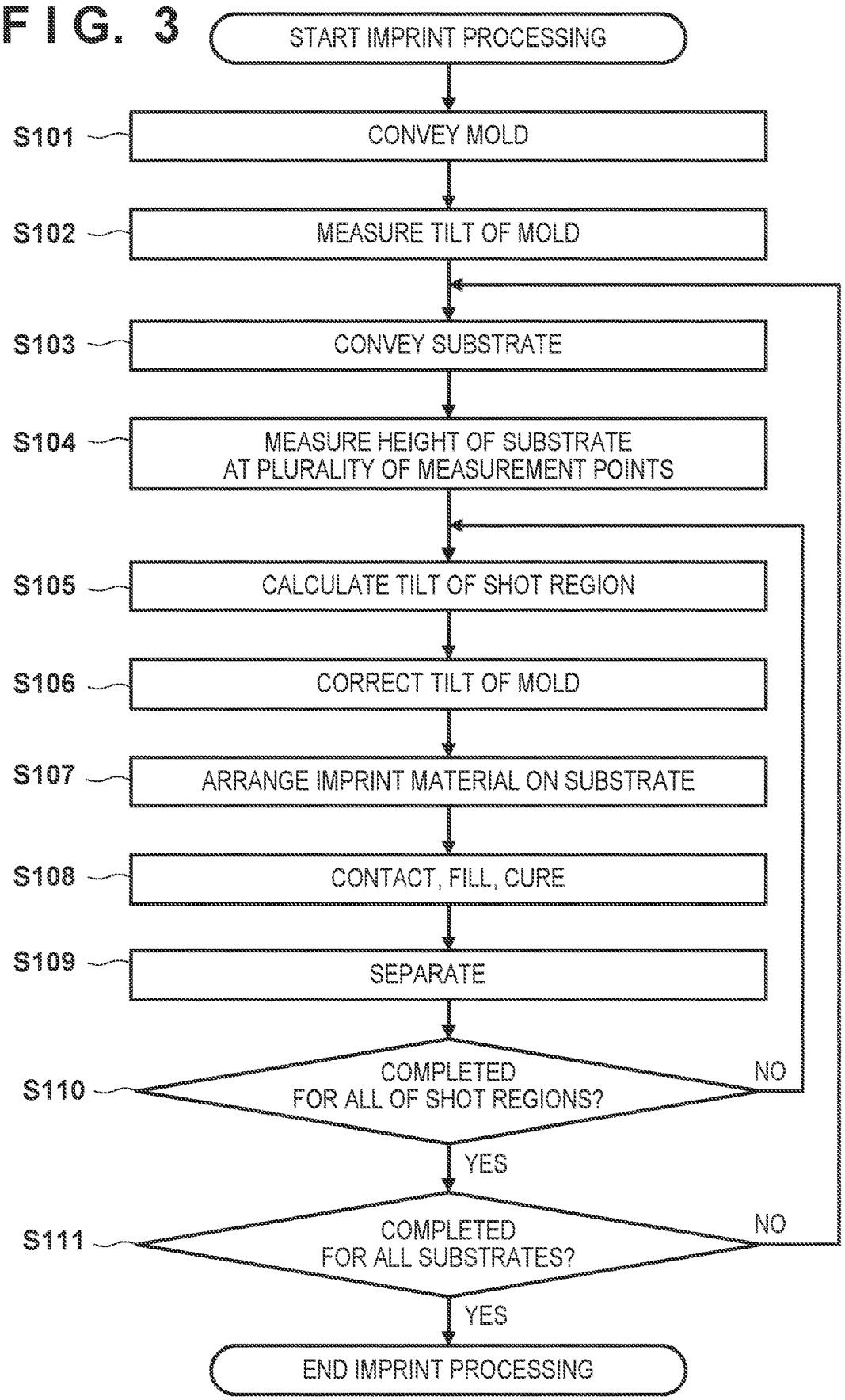
FIG. 3 is a flowchart showing the procedure of a pattern formation job.
Figure 4:
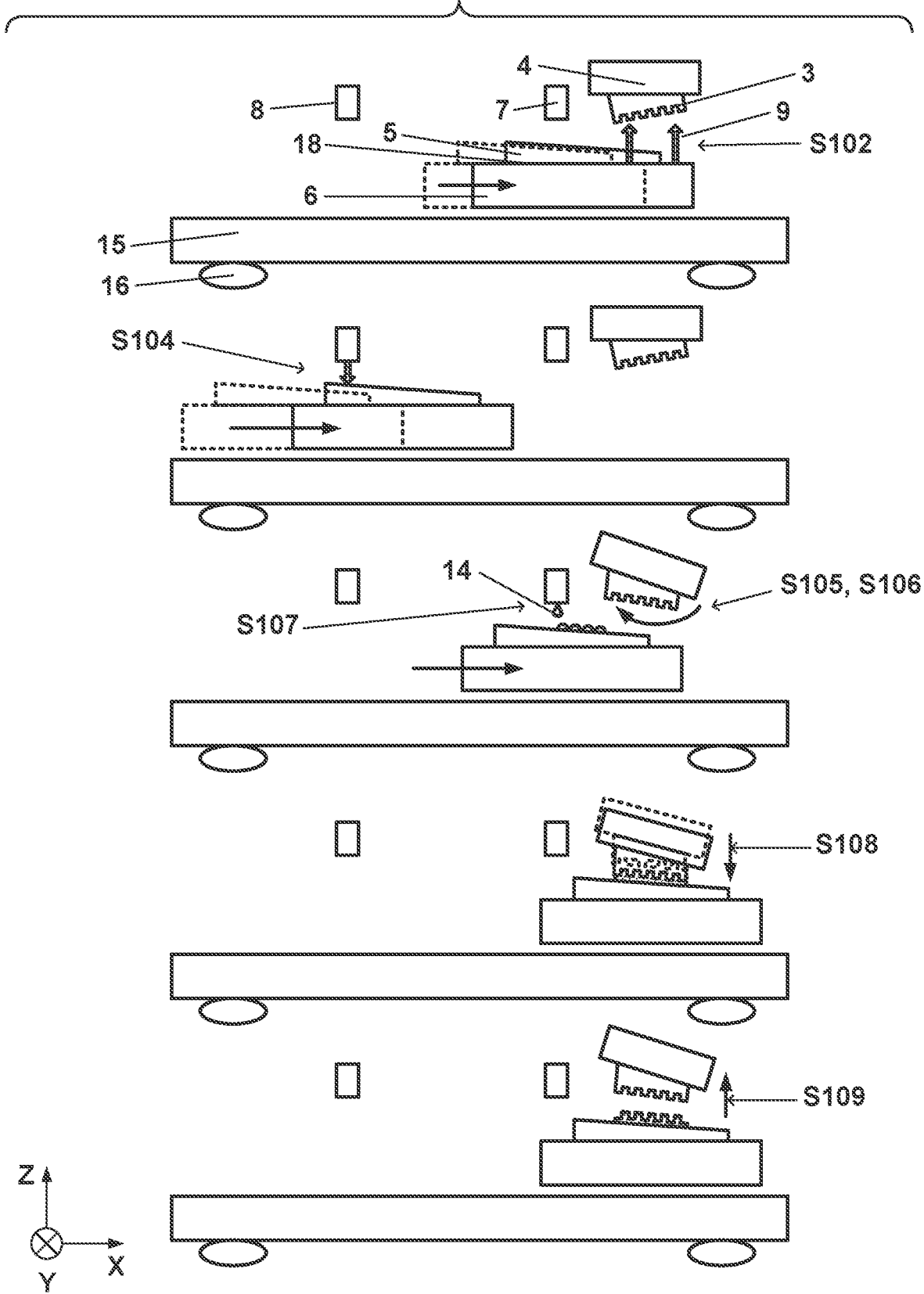
FIG. 4 is a view schematically showing the change in the state of the imprint apparatus in the pattern formation job.

A pattern formation job executed by the imprint apparatus 1 will be described below with reference to FIGS. 3 and 4. The controller 10 controls the execution of the pattern formation job. The pattern formation job includes processing performed on at least one substrate 5. The processing on each substrate 5 includes a plurality of imprint processes, and each imprint process can include a process to form a pattern on a shot region selected from a plurality of shot regions of the substrate 5. FIG. 3 shows a flowchart illustrating the procedure of the pattern formation job. FIG. 4 schematically shows the change in the state of the imprint apparatus 1 during the pattern formation job. The reference numerals denoting the processes shown in FIG. 4 correspond to the reference numerals denoting the processes shown in FIG. 3.

First, in the process of step S101, the mold 3 is conveyed to the imprint head 4 by the mold conveyance mechanism 11 and is held by the imprint head 4. In step S102, the mold height sensor 9 is used to measure the tilt of the pattern region of the mold 3. By measuring the height of the pattern region of the mold 3 based on at least two measurement points with different X-coordinate values and at least two measurement points with different Y-coordinate values, it will be possible to measure the tilt with respect to the θX-axis and the tilt with respect to the θY-axis. To improve the measurement accuracy by an averaging effect or to measure a quadratic surface or a higher-order surface, the height of the pattern region of the mold 3 can be measured by measuring three to five measurement points with different X-coordinate values and three to five measurement points with different Y-coordinate values. The number of measurement points can be determined in accordance with the throughput and the measurement accuracy.

Next, in step S103, the substrate 5 can be conveyed to the substrate stage 6 by the substrate conveyance mechanism 12 and be held by the substrate stage 6. Next, in step S104, the substrate height sensor (measuring device) 8 can be used to measure the shape of the surface of the substrate 5. To approximate the surface of the substrate 5 by a linear function, that is, a plane, the height of the surface of the substrate 5 needs to be measured by measuring at least three measurement points which are not arranged in a single column. To improve the measurement accuracy based on an averaging effect, it is preferable to measure the height of the surface of the substrate 5 by measuring five to seven measurement points. To approximate the surface of the substrate 5 by a quadratic function, the surface of the substrate 5 needs to be measured by measuring even more measurement points. Note that the timing at which the mold 3 is to be conveyed to the imprint head 4 and the timing at which the substrate 5 is to be conveyed to the substrate stage 6 suffice to be before the execution of the processes of step S102 and step S104, respectively.

In step S105, the controller 10 can calculate or determine the tilt/and or the height of a shot region selected from a plurality of shot regions of the substrate 5, that is, a shot region (to be referred to as a "shot region to be processed" hereinafter) in which a pattern is to be formed immediately after. The tilt of the shot region to be processed is a tilt based on the tilt with respect to the θX-axis and the tilt with respect to the θY-axis. The tilt of the shot region to be processed can be calculated or determined based on the position of the shot region to be processed on the substrate 5 and the shape of the surface of the substrate 5 measured in the process of step S104. This process will be described in detail later.

In step S106, the relative orientation between the substrate 5 and the mold 3 can be controlled by the substrate positioning mechanism 30 and/or the imprint head 4 so that the shot region to be processed and the pattern region of the mold 3 will be parallel in accordance with the tilt calculated or determined in step S105. In one example, the imprint head 4 can control the tilt of the mold 3 so that the shot region to be processed and the pattern region of the mold 3 will be parallel. A technique disclosed in Japanese Patent 6497938 can be applied here to control the relative orientation between the shot region to be processed and the pattern region of the mold 3. In another example, the substrate positioning mechanism 30 can control the tilt of the substrate 5 so that the shot region to be processed and the pattern region of the mold 3 will be parallel. Also, in step S106, the relative position between the substrate 5 and the mold 3 can be controlled by the substrate positioning mechanism 30 and/or the imprint head 4 so that the interval between the shot region to be processed and the pattern region of the mold 3 will be a target interval in accordance with the height calculated in step S105.

In step S107, the dispenser 7 can arrange the imprint material 14 onto the shot region to be processed. Note that the imprint material 14 may be applied continuously onto a plurality of shot regions by the dispenser 7, and the process of step S107 will be skipped if it is determined that the imprint material 14 has already been arranged on the shot region to be processed in step S107. In step S108, the imprint head 4 and/or the substrate positioning mechanism 30 is controlled to bring the imprint material 14 on the shot region to be processed and the pattern region of the mold 3 into contact with each other. In step S108, the TTM scope 13 may be used to align the mold 3 and the shot region to be processed. Furthermore, in step S108, after a concave portion of the pattern region of the mold 3 and a space between the pattern region and the shot region to be processed have been filled with the imprint material 14, the curing unit 2 will irradiate the imprint material 14 on the shot region to be processed with a curing energy. As a result, the pattern of the pattern region of the mold 3 will be transferred to the imprint material 14, and a pattern made of the cured product of the imprint material 14 is formed on the shot region to be processed. In step S109, the imprint head 4 and/or the substrate positioning mechanism 30 is controlled so as to separate the cured imprint material 14 on the shot region to be processed and the pattern region of the mold 3 from each other.

In step S110, the controller 10 determines whether the imprint process has been completed for all of the shot regions of the substrate 5. If there are remaining shot regions which have not undergone the imprint process, the controller 10 will select a new shot region to be processed from these shot regions and execute the processes of steps S105 to S109 on this shot region to be processed. On the other hand, if there is no remaining shot region which has not undergone the imprint process, the controller 10 will determine, in step S111, whether processing of all of the substrates forming the lot has been completed. If it is determined that the processing of all of the substrates have not been completed, the controller 10 will execute the processes of step S103 to S109 to process the next substrate.

As an example of an approximation of the shape of the surface of the substrate 5 by a function of an arbitrary order, an example in which the shape of the surface of the substrate 5 is approximated by a quadratic function (a quadratic surface) will be described hereinafter.

A quadratic function (a quadratic surface) can be expressed as $$Wz=Dz+Dx \cdot X+Dy \cdot Y+Dxx \cdot X^2+Dxy \cdot X \cdot Y+Dyy \cdot Y^2 \quad (1)$$

where (X, Y) are coordinates indicating a position on the substrate 5, Wz is a height of the surface of the substrate 5 at (X, Y), Dz is a zeroth-order coefficient, Dx and Dy are first-order coefficients, and Dxx, Dxy, and Dyy are second-order coefficients. In this manner, a quadratic function is expressed as a polynomial which includes six coefficients. To determine these six coefficients, the height of the surface of the substrate 5 needs to be measured by measuring at least six measurement points. However, to improve the accuracy of each coefficient, it is preferable to measure the height of the surface of the substrate 5 by measuring more than six measurement points and use the least squares method.

To more strictly specify the shape of the surface of the substrate 5, it is preferable to approximate the shape by a function of a higher order such as a cubic function or a quartic function. If the shape is to be approximated by a cubic function, ten coefficients will need to be determined, thus requiring at least ten measurement points. In a similar manner, if the shape is to be approximated by a quartic function, 15 coefficients will need to be determined, thus requiring at least 15 measurement points. In these cases as well, more measurement points can be measured to use the least squares method. Since the height of the surface of the substrate 5 needs to be measured by measuring more measurement points in this manner to accurately specify the shape of the surface of the substrate 5, the throughput can degrade.

A method of obtaining the tilt of a shot region to be processed from an approximation function (curved surface) approximating the shape of the surface of the substrate 5 will be described below. Although an example in which the function approximating the shape of the surface of the substrate 5 is expressed by equation (1), that is, a quadratic function will be described here, the order of the function for approximating the shape of the surface of the substrate 5 may be of another order.

To obtain the tilt of the shot region to be processed from an approximation function that approximates the shape of the surface of the substrate 5, the tilt of a tangent of the approximation function, that is, the partial derivative of the approximation function can be obtained. Letting (X, Y) be the coordinates of the center position of the shot region to be processed, the tilt with respect to the θY-axis and the tilt with respect to the θX-axis are given by $$\text{tilt with respect to } \theta Y\text{-axis}=\partial Wz/\partial x=Dx+2 \cdot Dxx \cdot X+Dxy \cdot Y \quad (2)$$

$$\text{tilt with respect to } \theta X\text{-axis}=\partial Wz/\partial y=Dy+2 \cdot Dyy \cdot Y+Dxy \cdot X, \quad (3)$$

respectively.

In addition, the height at the center position of the shot region to be processed is given by $$\text{height}=Dz+Dx \cdot X+Dy \cdot Y+Dxx \cdot X^2+Dxy \cdot X \cdot Y+Dyy \cdot Y^2 \quad (4)$$

Note that to obtain the height and the tilt of the shot region to be processed by using the measurement result of the height at each of the plurality of measurement points in the shot region to be processed, a linear plane (linear function) is obtained by least squares approximation so as to obtain $$Wz=Dz+Dx \cdot X+Dy \cdot Y— \quad (5)$$

and calculate so that $$\text{tilt with respect to } \theta Y\text{-axis}=Dx \quad (6)$$

$$\text{tilt with respect to } \theta X\text{-axis}=Dy \quad (7)$$

$$\text{height}=Dz+Dx \cdot X+Dy \cdot Y \quad (8)$$

Figure 5:
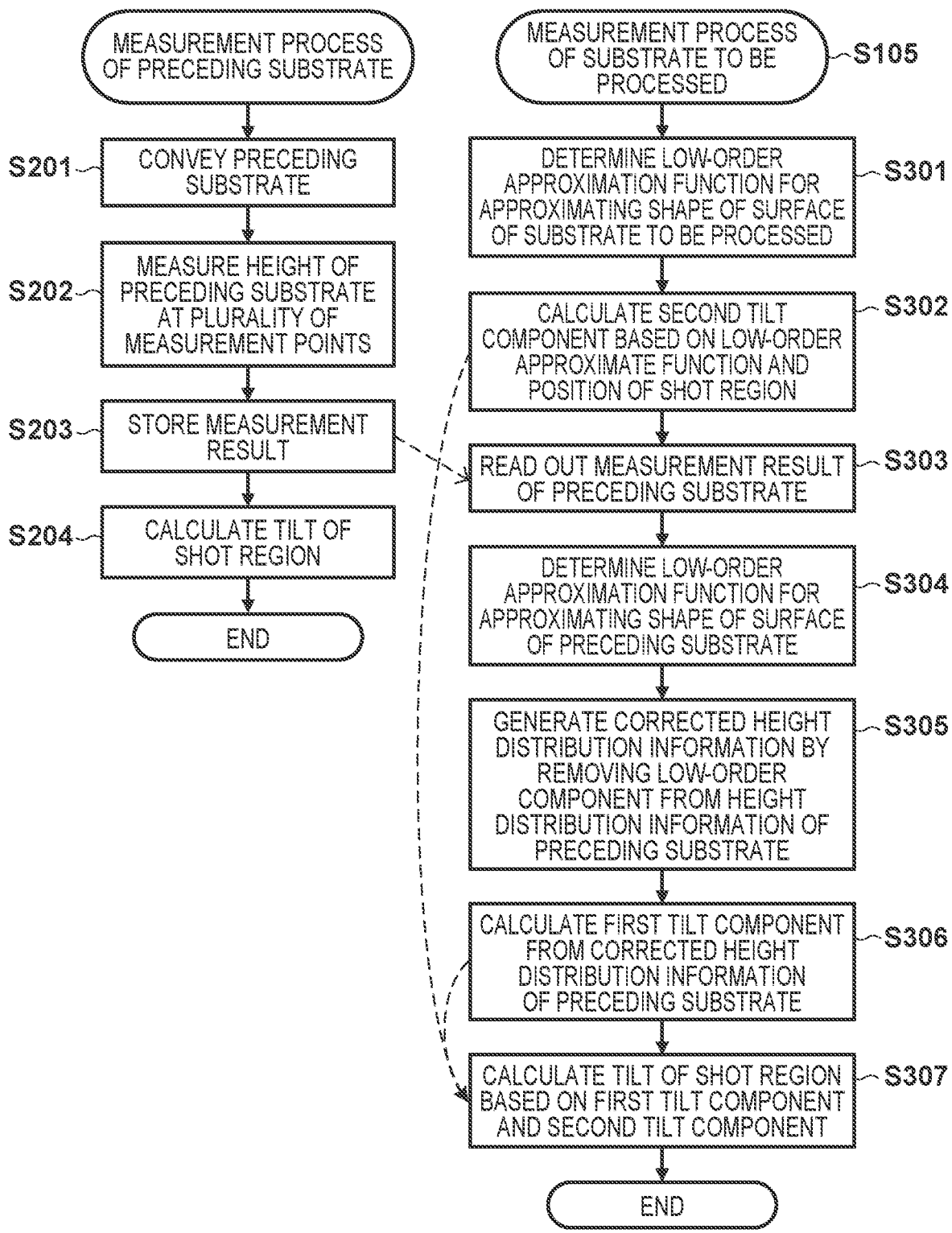
FIG. 5 is a flowchart showing the procedure of processing of step S105 of the flowchart of FIG. 3.
Figure 6:
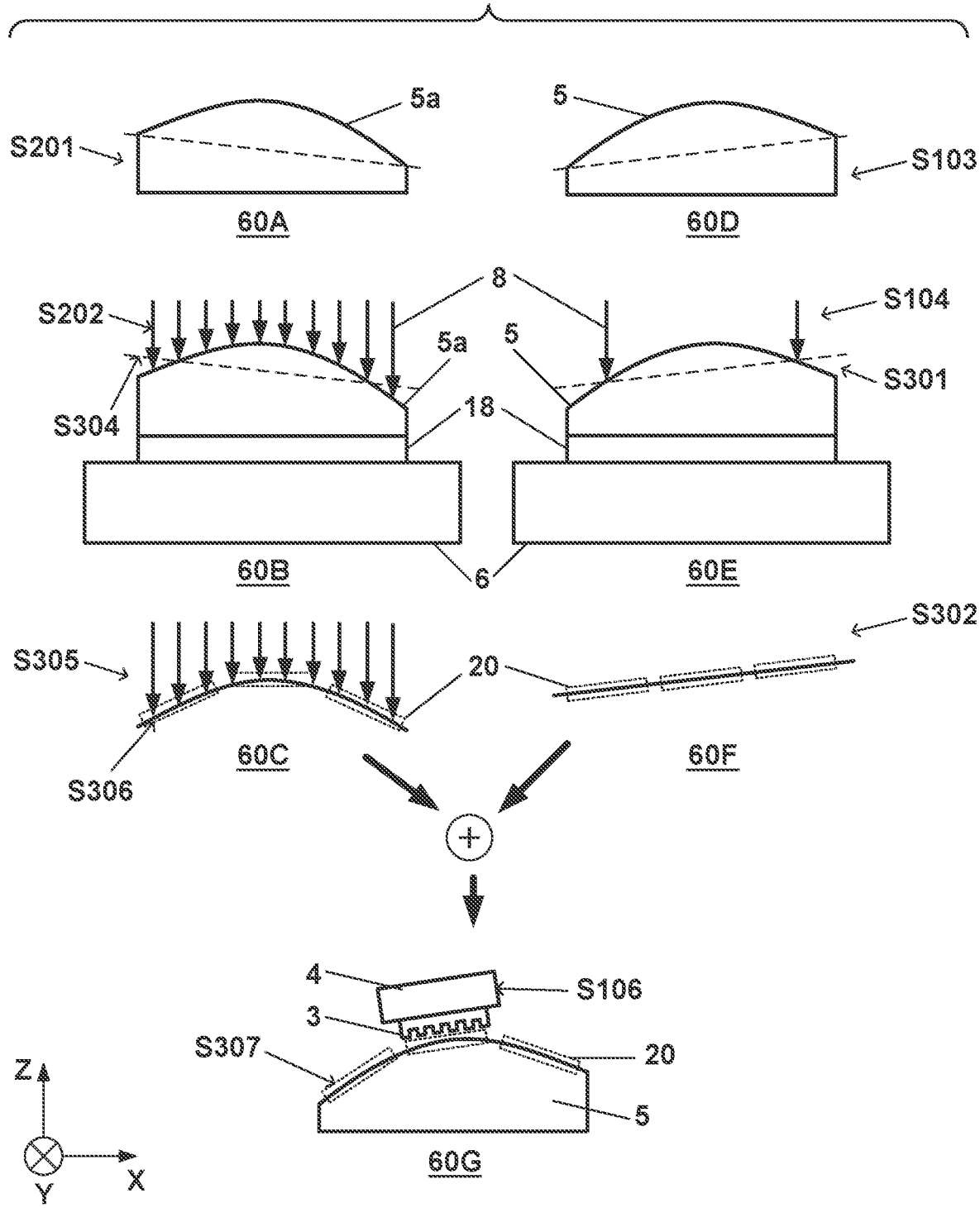
FIG. 6 is a view schematically showing the main processes of the procedure shown in the flowchart of FIG. 5.

The first embodiment will be described hereinafter with reference to FIGS. 5 and 6. FIG. 5 shows the procedure of processing (the measurement process of the shot region to be processed) of step S105 of the flowchart of FIG. 3. FIG. 5 also shows the procedure of processing (the measurement process of a preceding substrate) to be executed in advance of the processing shown in the flowchart of FIG. 3. FIG. 6 schematically shows the main processes of the flowchart of FIG. 5. The reference numerals of the processes shown in FIG. 6 correspond to the reference numerals of the processes shown in FIG. 5.

The surface of the substrate 5 can have, for example, a curved shape which can be approximated by a second-order or a higher-order (third order or higher) function. For example, a high-order component of a second order or higher can be a common component among the plurality of substrates 5 forming the same lot. This is because the substrates 5 belonging to the same lot undergo the same process. On the other hand, among the plurality of substrates 5 forming the same lot, zeroth-order (height) and first-order (tilt) components tend to vary. This can be due to an arrangement error or the like of each substrate 5 on the substrate stage 6.

A preceding substrate 5a is, for example, the first substrate of a lot, and the substrate 5 to be processed can be the second or subsequent substrate of the lot. The measurement of the preceding substrate 5a will be described first. The measurement process of the preceding substrate 5a can include the processes of steps S201 to S204. If the preceding substrate 5a is the first substrate of the lot, the process of step S201 is executed in step S103 of the flowchart shown in FIG. 3, and the processes of steps S203 and S204 can be executed in step S104. In addition, the process of step S204 can be executed in step S105.

In step S201, the preceding substrate (first substrate) 5a can be conveyed to the substrate stage 6 by the substrate conveyance mechanism 12 and be held by the substrate stage 6. Next, in step S202, the substrate height sensor 8 is used to measure the shape of the surface of the preceding substrate 5a. More specifically, in step S202, the substrate height sensor 8 can be used to measure the height of the surface of the preceding substrate 5a by measuring a plurality (a first number) of measurement points. As a result, the controller 10 can obtain the first height distribution information indicating the height distribution of the surface of the preceding substrate 5*a*. This state is schematically shown in a schematic view 60B. The number (first number) of measurement points can be determined here in accordance with the order of the approximation function used to approximate the shape of the surface of the preceding substrate 5*a*. In step S203, the controller 10 can store the measurement result obtained in step S202 in a storage device. In step S204, the controller 10 can calculate the tilt of a shot region to be processed based on the measurement result stored in step S203.

The measurement of the substrate 5 to be processed will be described next. First, in the process of step S104 of FIG. 3, the substrate height sensor 8 can be used to measure the shape of the surface of the substrate 5 to be processed (second substrate). More specifically, in step S104, the substrate height sensor (measuring device) 8 can be used to measure the height of the surface of the substrate 5 to be processed by measuring a plurality (second number) of measurement points. This state is schematically shown in a schematic view 60E. As a result, the controller 10 can obtain the second height distribution information indicating the height distribution of the surface of the substrate 5 to be processed. Typically, the number (second number) of the measurement points used to measure the height of the surface of the substrate 5 to be processed (second substrate) is less than the number (first number) of the measurement points used to measure the height of the surface of the preceding substrate (first substrate) 5*a*.

Next, in step S301, the controller 10 determines, based on the second height distribution information obtained in step S104, a second component which is an approximation function of a second predetermined order or lower for approximating the shape of the surface of the substrate 5 to be processed. Here, although the second component which is an approximation function of a second predetermined order or lower can be, for example, a component of a second order or lower, a first-order component, or a zeroth-order component, it is not limited to this. Note that considering the balance between the measurement accuracy and the throughput, it is preferable to set a quadratic function as the second component.

The second component which is an approximation function of a second predetermined order or lower for approximating the shape of the surface of the substrate 5 to be processed is exemplarily indicated by a dotted line in a schematic view 60E. The number (second number) of measurement points in the process of step S104 can be determined in accordance with the order of the approximation function (second component) determined in step S301. For example, if the approximation function (second component) is a linear function representing a linear plane, at least three measurement points which are not on a straight line will be required, and four or five measurement points can be set to reduce measurement errors. The approximation function (second component) can be determined by, for example, the least squares method based on the second height distribution information obtained in step S104.

In step S302, the controller 10 obtains a second tilt component (a tilt based on the second component) of a shot region to be processed based on the approximation function (second component) determined in step S301 and the position of the shot region to be processed of the substrate 5 to be processed. Here, if the approximation function (second component) for approximating the shape of the surface of the substrate 5 to be processed is a linear plane (linear function) as in the example of the schematic view 60E, the second tilt component will be the same regardless of the position of the shot region. If the approximation function (second component) for approximating the shape of the surface of the substrate 5 to be processed is a quadratic surface (quadratic function), the second tilt component of the shot region can be calculated by using equations (2) and (3). A schematic view 60F schematically shows the second tilt component of the shot region to be processed on the substrate 5 to be processed.

Next, in step S303, the controller 10 reads out the first height distribution information of the preceding substrate 5*a* stored in step S203. In step S304, the controller 10 determines, based on the first height distribution information read out in step S303, a first component which is an approximation function of a first predetermined order or lower for approximating the shape of the surface of preceding substrate (first substrate) 5*a*. It is preferable for the order of the approximation function (first component) for approximating the shape of the surface of the preceding substrate (first substrate) 5*a* to be the same as the order of the approximation function (second component) for approximating the shape of the surface of the substrate 5 to be processed (second substrate) determined in step S301. In other words, it is preferable for the second predetermined order to be the same as the first predetermined order. However, if an order unnecessary for determining the tilt of the shot region to be processed is present, the second predetermined order may differ from the first predetermined order.

In the example of the schematic view 60B, the approximation function (first component) of the first predetermined order or lower for approximating the shape of the surface of the preceding substrate (first substrate) 5*a* is a linear function (linear plane) and is indicated by a dotted line. The approximation function for approximating the shape of the surface of the preceding substrate (first substrate) 5*a* may be obtained based on all of the pieces of the first height distribution information, that is, the height information of every measurement point or may be obtained based on the height information of the same measurement points as shown in the schematic view 60E. If a linear plane is to be obtained from the height information of every measurement point, an approximation function may be calculated by using a quadratic surface instead of approximating by using a linear plane, and use zeroth-order and first-order terms or coefficients obtained from it. In other words, the controller 10 may obtain a component of the first predetermined order or lower by extracting the component of the first predetermined order or lower from the approximation function that approximates the first height distribution information indicating the height distribution of the surface of the preceding substrate 5*a*.

In step S305, the controller 10 generates a corrected height distribution information by removing the component (first component) of the approximation function of the first predetermined order or lower determined from the first height distribution information in step S304. This can be understood also as an extraction of a component of an order which exceeds the first predetermined order from the first height distribution information. The component of an order which exceeds the first predetermined order is schematically shown in a schematic view 60C.

In the example shown in FIG. 6, the reference symbol of the first component of the preceding substrate 5*a* shown in a schematic view 60A is the reverse of that of the substrate 5 shown in a schematic view 60D for the sake of descriptive convenience. Hence, in step S305, if the linear component is not removed from the first height distribution information of the preceding substrate 5a, the linear component of the schematic view 60A and the linear component of the schematic view 60D will cancel each other out. As a result, the linear component will be zero and only the quadratic component will be calculated. To be correct, the shape of the schematic view 60D needs to be reproduced. Hence, the process of step S305 is required, and the component (first component) of the first predetermined order or lower is removed from the first height distribution information of the preceding substrate 5a.

In step S306, the controller 10 obtains, based on the corrected height distribution information and the position of the shot region arranged at the same position as the shot region to be processed of the substrate 5 to be processed, a first tilt component (a tilt based on the first component) of the shot region to be processed of the substrate 5 to be processed. This can be calculated based on the coordinates of the center of the shot region and a function obtained by partially deriving the approximation function for approximating the corrected height distribution information. More preferably, in step S202, measurement will be performed at a fine pitch so as to include a plurality of measurement points in the shot region, and approximate the shot region in step S306 by using a linear plane by using the measurement values of the plurality of measurement points included in the shot region. This is as shown in equations (6) and (7). Since at least two measurement points are included in the shot region in also the example shown in the schematic view 60C, these measurement points can be used to perform linear approximation. The tilt of each of three shot regions is exemplified in the schematic view 60C. Note that the schematic view 60C is merely a conceptual view. Since each shot region is sufficiently small with respect to the substrate 5a, there is no problem in terms of accuracy even if the shot region is approximated by using a linear plane.

In step S307, the controller 10 obtains the tilt of the shot region to be processed from the first tilt component of the shot region obtained from the measurement result of the preceding substrate 5a in step S306 and the second tilt component of the shot region to be processed obtained from the measurement result of the substrate 5 to be processed in step S302. More specifically, the controller 10 obtains the tilt of the shot region to be processed by adding the first tilt component of the shot region obtained from the measurement result of the preceding substrate 5a and the second tilt component of the shot region to be processed obtained from the measurement result of the substrate 5 to be processed. The tilt of the shot region to be processed obtained in this manner is schematically shown in a schematic view 60G.

FIG. 6 is merely a simplified example to facilitate understanding of the procedure, and the present invention is not limited to such an example. The first predetermined order and the second predetermined order can be set arbitrarily. For example, in the measurement of the height of the surface of the preceding substrate in step S202, measurement can be performed at a pitch smaller than the size of the shot region as shown in the schematic view 60B to allow the surface of the preceding substrate to be approximated by a curved surface which includes a cubic component, a quartic component, or a component of a fifth order or higher. In addition, in the measurement of the height of the surface of the substrate to be processed in step S104, measuring more than six measurement points of the substrate to be processed will allow the shape of the surface of the substrate to be processed to be approximated by a quadratic surface in step S301. In this case, quadratic surface components (zeroth-order, first-order, and second-order coefficients) can be removed from the measurement values of the preceding substrate in step S305. In a similar manner, by measuring more than ten measurement points in step S104, it will be possible to approximate the shape of the surface of the substrate to be processed by using a cubic surface in step S301. In this case, cubic surface components (zeroth-order, first-order, second-order, and third-order coefficients) can be removed from the measurement values of the preceding substrate in step S305. Since increasing the measurement points in step S104 reduces the throughput, it is preferable, in general use, to set six or seven as the number of measurement points in step S104 and perform up to a functional approximation of a quadratic surface in step S301. As described above, since the measurement of the preceding substrate in step S202 will not influence the throughput, it is preferable to measure the measurement points according to a pitch smaller than the size of the shot region, that is, ideally lattices having a pitch of one to few mm, and sufficiently cover high-order components.

The preceding substrate to be measured in step S202 need not be the first substrate belonging to the same lot as the substrate to be processed, but may also be a plurality of substrates belonging to the same lot. In such a case, the plurality of substrates can be measured, and an average value of the obtained measurement values can be used. In addition, if the imprint process is to be executed continuously on a plurality of substrates, the process of step S202 may be executed by setting at least one of the first substrates as the preceding substrate.

The processing shown in FIG. 5 is merely an example, and the order of the processes can be switched within a noncontradictory range. For example, since the processes of steps S301, S303, S304, and S305 need not be performed every shot region, these processes may be performed as a part of the process of step S104 or be performed immediately after the step S104. In addition, if the coordinate values of all of the shot regions are known in advance, the tilt of every shot region can be calculated and stored in the storage device immediately after the process of step S104, and the tilt retrieved from the storage device can be used in step S106.

Furthermore, the information to be stored in the storage device in step S203 is not limited to the measurement values of the preceding substrate 5a. The information may be the result obtained by removing approximation function components in step S305 or the information may be stored in the storage device after calculating all of the tilt values to be calculated in step S306. However, more generally, the information obtained in step S202 of FIG. 6 can be stored in the storage device in step S203.

The operation of the first embodiment can be summarized as follows.

The controller 10 obtains the first height distribution information indicating the height distribution of the surface of the first substrate (preceding substrate 5a) (step S303).

The controller 10 uses the substrate height sensor (measuring device) 8 to obtain the second height distribution information indicating the height distribution of the surface of the second substrate (substrate 5) (step S104).

The controller 10 obtains the corrected height distribution information by removing a first component, which is an approximation function of a first predetermined order or lower for approximating the first height distribution information, from the first height distribution information (steps S304 and S305).

The controller 10 controls the imprint process based on the corrected height distribution information and a second component which is an approximation function of a second predetermined order or lower for approximating the second height distribution information (steps S301, S302, S306, S307, and S106).

Figure 7:
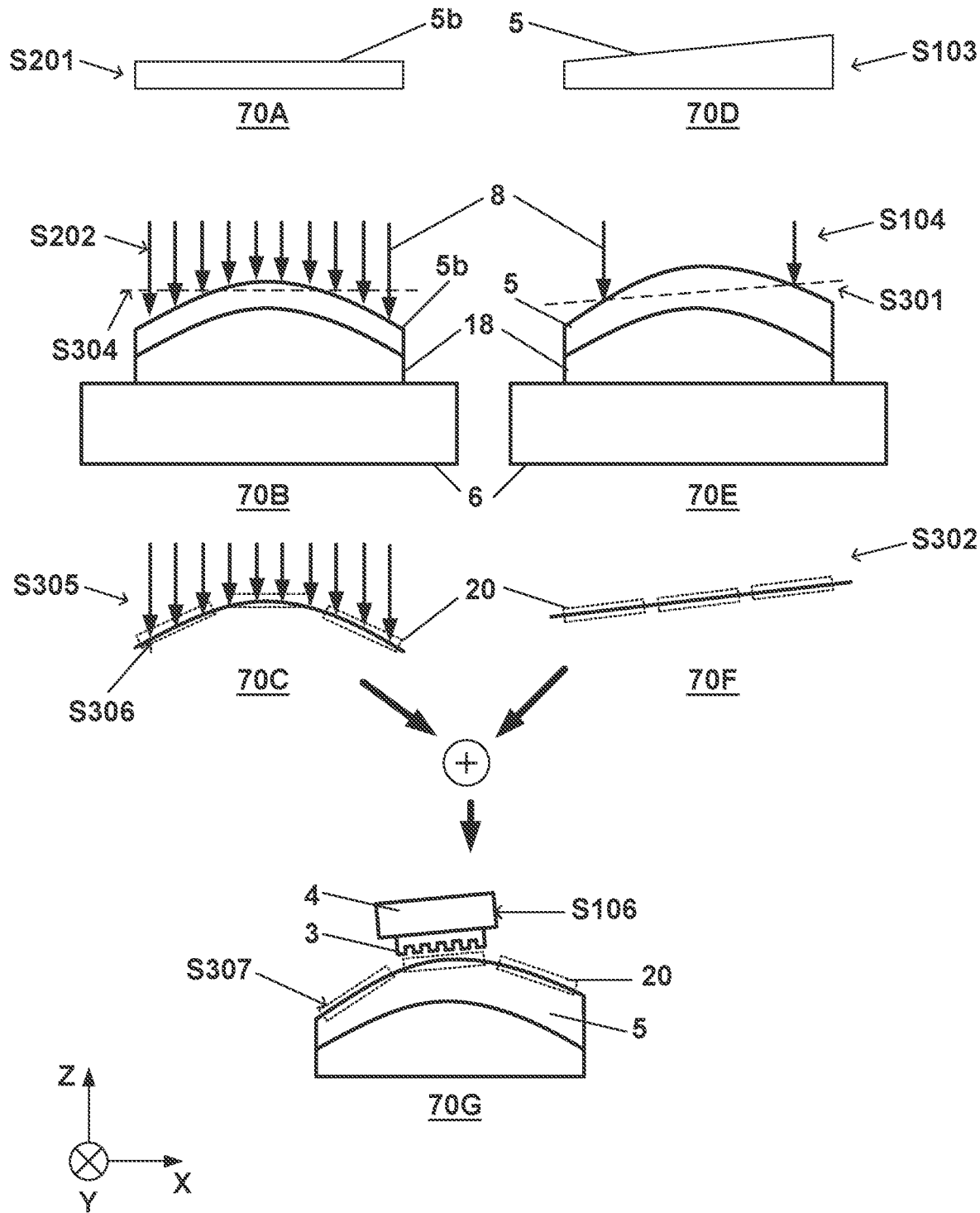
FIG. 7 is a view schematically showing the main processes of the procedure shown in the flowchart of FIG. 5.

The second embodiment will be described hereinafter. In the first embodiment, at least one of the substrates at the beginning of the lot can be used as the preceding substrate (first substrate). In the second embodiment, an ultra-flat substrate 5b is used as the preceding substrate (first substrate). The ultra-flat substrate 5b is a substrate with a flatness higher than the flatness of a substrate 5 to be processed. In the second embodiment is advantageous when factors related to an imprint apparatus 1, for example, the shape of a substrate chuck 18 and the shape components of a stage plate 15 as a reference for the movement of a substrate stage 6 have greater influence than the shape of the surface of the substrate 5 to be processed. FIG. 7 shows an example in which the shape of a chucking surface of the substrate chuck 18 includes a large quadratic component. Although the shape of the chucking surface of the substrate chuck 18 has been shown in an exaggerated manner in FIG. 7, it is difficult to accurately flatten the entire chucking surface of the substrate chuck, which, for example, extends to φ300 mm. Hence, the chucking surface can have at least this kind of component.

A schematic view 70B schematically shows a state in which the chucking surface of the substrate chuck 18 includes a quadratic component, and the ultra-flat substrate 5b has been chucked to the chucking surface. Since the shape of the ultra-flat substrate 5b follows the shape of the chucking surface of the substrate chuck 18, the shape of the surface of the ultra-flat substrate 5b also includes a quadratic component. A schematic view 70E schematically shows a state in which the substrate 5 to be processed has been chucked to the chucking surface of the same substrate chuck 18. As schematically shown in a schematic view 70D, a linear component of the substrate 5 to be processed can differ from that of the ultra-flat substrate 5b shown in a schematic view 70A.

In this example, the method for accurately obtaining the tilt of the shot region is the same as that shown in the flowchart of FIG. 5. The ultra-flat substrate 5b of the schematic view 70A can be set as the preceding substrate, and the shape of the surface can be measured in step S202. As a result, for example, as schematically shown in the schematic view 70B, the shape of a quadratic surface can be measured. The substrate 5 to be processed of the schematic view 70D can also be measured in step S104 in accordance with the procedure of the flowchart of FIG. 5. Here, for example, as schematically shown in the schematic view 70E, measurement can be performed to measure the linear component.

In the processes of steps S304 and S305, the linear component of the surface is removed from the height distribution information of the surface of the ultra-flat substrate 5b as the preceding substrate. Note that an example in which a linear component is absent is shown in the schematic view 70B. However, since components of a first order and lower will be removed in step S305 even if the linear component is present and the linear component schematically shown in the schematic view 70E will be ultimately used, it will not be a problem. A result obtained by removing components of a first order and lower from the height distribution information of the schematic view 70B is schematically shown in a schematic view 70C, and a first tilt component of the shot region can be obtained from this result in step S306.

In step S301, components of a first order or lower are calculated from the height distribution information schematically shown in the schematic view 70E. This result is schematically shown in a schematic view 70F. In step S302, the second tilt component of the shot region to be processed is obtained from the components of a first order or lower calculated in step S301. In step S307, the first tilt component obtained in step S306 and the second tilt component obtained in step S302 are added to obtain the tilt of the shot region to be processed. This result is schematically shown in a schematic view 70G.

That is, executing processing similar to that of the first embodiment will allow the tilt of the shot region to be accurately obtained as a result. The difference from the first embodiment is in whether the first tilt component depends on the shape of the surface of a preceding substrate 5a or on the shape of the surface of the substrate chuck 18. Although the shape of a surface including both elements is normally measured by using a substrate height sensor 8, it will be possible to accurately measure the tilt of the shot region to be processed of the substrate to be processed in accordance with the procedure of the flowchart of FIG. 5 without consideration to this fact.

The processes from steps S201 to S203 for measuring a high-order component as a factor related to the imprint apparatus 1 basically need only be executed once during the adjustment of the imprint apparatus 1. Alternatively, these processes may be executed when the substrate chuck 18 is to be replaced or during maintenance of the imprint apparatus 1. The processes from steps S201 to S203 will need to be executed again for the preceding substrate if the lot switching occurs in the first embodiment. However, as long as a process which does not require the tilt of the shot region to be considered is to be performed, it will suffice to execute only the second embodiment. If the first embodiment and the second embodiment are to be alternatively executed in accordance with the lot, a plurality of storage areas for storing the result in step S203 can be arranged, and the storage area may be switched in accordance with each lot.

The third embodiment will be described hereinafter. The processes of steps S201 to S203 basically need only be executed once for each single lot. However, if a long time has elapsed since the execution of the processes of steps S201 to S203, the shape of the surface of a substrate 5 to be processed may have changed from the shape of the surface of a preceding substrate 5a. In such a case, the process of steps S201 to S203 may be executed again. However, executing the process of step S202 will require a corresponding amount of time.

Hence, the number of measurement points of, for example, only the first substrate 5 to be processed can be increased in step S104. For example, although only a zeroth-component and a linear component may be measured normally by setting three measurement points, components up to quadratic components will be measured by setting six measurement points for at least the first substrate 5 to be processed. Subsequently, coefficients (corresponding to Dxx, Dxy, and Dyy of equation (1)) of the quadratic component will also be used in the subsequent substrate 5 to be processed. As a result, it will be possible to accurately determine the tilt of the shot region to be processed without reducing the throughput of the second and subsequent substrates 5 to be processed. In this case, in step S305, the components (zeroth-order, linear, and quadratic components) of a second order and lower will be removed from the measurement values of the preceding substrate 5a. As a result, high-order components of a third order or higher will be obtained in the measurement of the preceding substrate 5a in step S202, the quadratic component will be obtained by using the first substrate 5 to be processed, and the zeroth and the linear components will be obtained during the imprint process on the following substrate 5 to be processed.

This kind of operation can be summarized as follows.

A controller 10 obtains the first height distribution information indicating the height distribution of the surface of the first substrate (preceding substrate 5a) (step S303).

The controller 10 uses a substrate height sensor (measuring device) 8 to obtain the second height distribution information indicating the height distribution of the surface of the second substrate (at least one of the plurality of substrates 5) (step S104).

The controller 10 uses the substrate height sensor (measuring device) 8 to obtain the third height distribution information of the height distribution of the surface of a third substrate (the following substrate 5 to be processed of the plurality of substrates 5 to be processed) (step S104).

The controller 10 obtains the second component (including components of a second predetermined order or lower and components of an order higher than a third predetermined order which is lower than the second predetermined order) for approximating the second height distribution information (step S301).

The controller 10 obtains the third component (a function of third predetermined order or less) for approximating the third height distribution information (steps S301, S302, S304, S305, S306, S307, and S106).

In addition, the controller 10 may determine, for each coefficient of the approximation function, whether to inherit the coefficient from the first substrate 5 to be processed. For example, consider a case in which Dxy is assumed to be a coefficient with little change in each substrate to be processed while Dxx and Dyy are assumed to be coefficients to be determined for each substrate to be processed. In this case, the second-order coefficients Dxx, Dxy, and Dyy will all be calculated by setting six measurement points for the first substrate to be processed. Subsequently, for the second substrate to be processed, only five measurement points will be set so that the value determined in the processing of the first substrate to be processed will be inherited for only Dxy and the values of Dxx and Dyy will be newly calculated from the obtained measurement values.

Since the influence of a measurement error will be received more easily as higher the order of the coefficient is, it is preferable, normally, to increase the number of measurement points and use the least squares method. That is, even in a case in five or six measurement points are present in each of the second and subsequent substrates to be processed, there may be a case in which the second-order coefficients will not be calculated on purpose. That is, the first substrate to be processed may be set to have about seven to ten measurement points, the corresponding coefficients may be obtained accurately, and the second-order coefficients Dxx, Dxy, and Dyy of the first substrate to be processed may be inherited by each of the second and subsequent substrates to be processed. For each of the second and subsequent substrates to be processed, only the linear component can be calculated from five to six measurement points by using the least squares method. Since using such a method will make it difficult to receive the influence of a measurement error from the substrate height sensor 8, it can be expected to improve accuracy.

The increase in the number of measurement points need not be limited to the first substrate to be processed and may be increased for a plurality of substrates or may be increased for every N (N is an integer of 2 or more) substrates to be processed.

The fourth embodiment will be described hereinafter. Normally, before an imprint process is to be performed, pre-alignment for measuring the arrangement (shot layout) of a plurality of shot regions on a substrate 5 can be performed by using an alignment scope (not shown). The alignment scope can have a wider field of view than that of a TTM scope 13 of FIG. 1. As a result, even if an arrangement error occurs when the substrate 5 is placed on a substrate stage 6, it will be possible to supplement the marks arranged in the substrate within the field of view of the alignment scope. In pre-alignment, normally, the positions of a plurality of marks can be measured, and a shot layout can be calculated by functional approximation.

Figure 8:
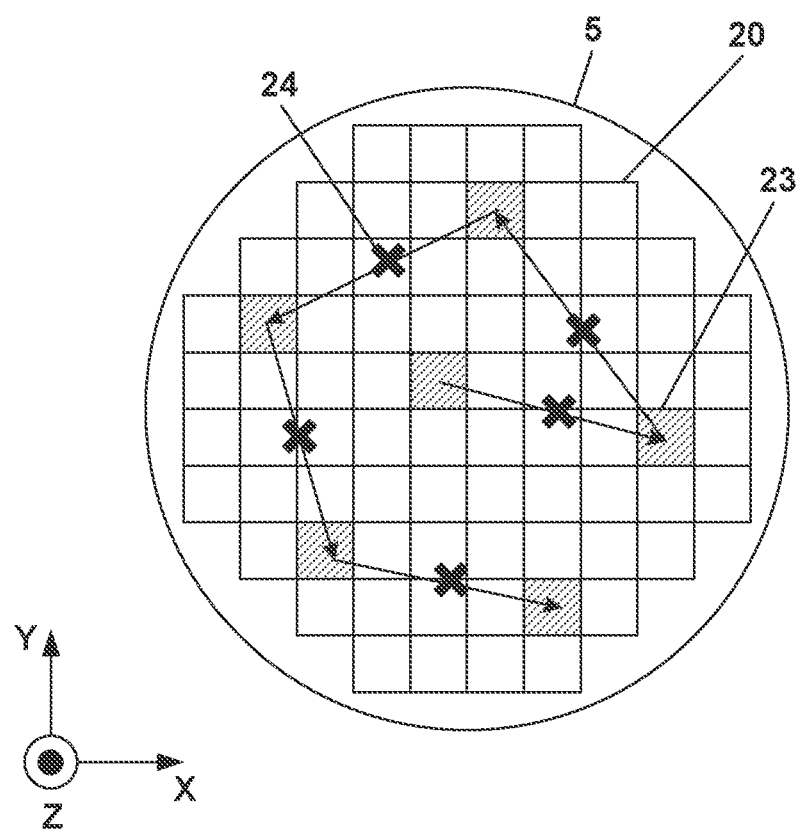
FIG. 8 is a conceptual view of pre-alignment.

FIG. 8 shows a conceptual view of pre-alignment. A plurality of shot regions of the substrate 5, more specifically, six shot regions in this example have been selected as shot regions 23 to be measured. By arranging a substrate height sensor 8 near this alignment scope, it will be possible to execute measurement (the process of step S104) by the substrate height sensor 8 in parallel with the pre-alignment and thus advantageously improve the throughput. Although the alignment scope will need to measure the alignment marks arranged on the substrate, the substrate height sensor 8 can measure basically anywhere without a problem as long as a reflection surface, that is, a substrate is present in a location to be measured.

Increasing the number of measurement points in step S104 will require the number of measurement points for pre-alignment measurement to be increased. Since pre-alignment measurement includes image capturing by an image capturing element, image processing, and the like, it basically requires a corresponding amount of time for processing. Hence, increasing the measurement points can lead to degradation of the throughput.

As described above, the location to be measured by the substrate height sensor 8 can be anywhere within the surface of the substrate 5. Hence, by measurement by the substrate height sensor 8 during the move from one pre-alignment measurement point to the next pre-alignment measurement point, it will be possible to increase the number of measurement points for height measurement. However, if measurement is performed while the substrate stage 6 is accelerating or decelerating, the measurement may be influenced by the change in the tilt or the height of the substrate stage 6. Hence, it is preferable to execute measurement by the substrate height sensor 8 in a section in which the substrate stage 6 is moving at a constant speed or in a moment at which the speed shifts from acceleration to deceleration. Normally, such an additional measurement point can be a midpoint between a set of pre-alignment measurement points. Such additional measurement points 24 are shown in FIG. 8. In this example, there are six measurement points (simultaneous measurement points) for measuring the height simultaneously with pre-alignment, and five height measurement points to be measured during movement between one simultaneous measurement point to another simultaneous measurement point. These measurement values can be used to perform approximation by a higher-order function, for example, a cubic function or be used to improve the calculation accuracy of coefficients by using the least squares method during the calculation of second-order coefficients.

Note that the calculation of a higher-order component of a preceding substrate 5a based on measurement values obtained in step S202 is similar to those performed in the first embodiment and the second embodiment.

Figure 9:
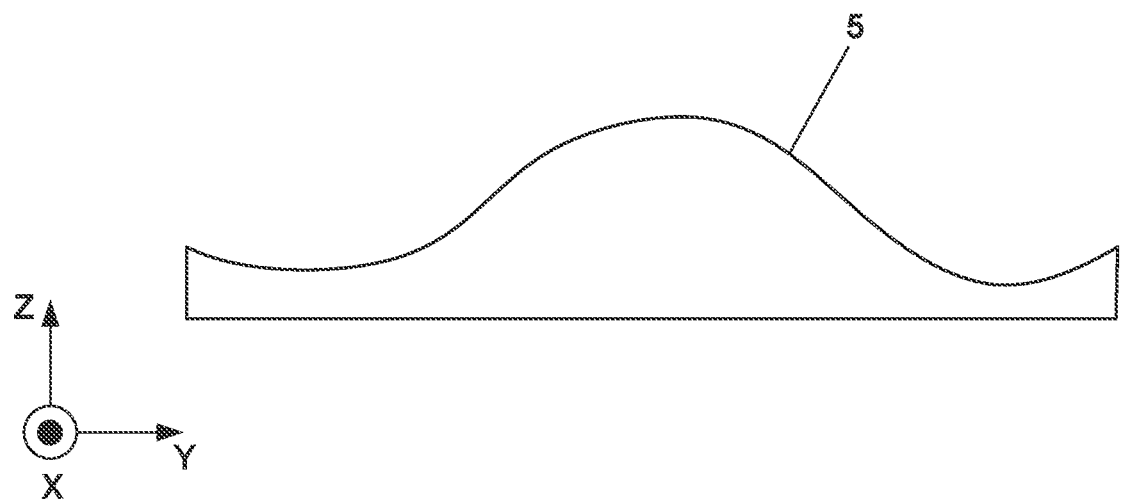
FIG. 9 is a view schematically showing a substrate that has a quartic shape.

The shape of the surface of the substrate 5 that has undergone various kinds of processes tends to have a shape with a higher peripheral portion, that is, a quartic shape. FIG. 9 schematically shows the substrate 5 which has a quartic shape. Even when the substrate 5 has such a shape, the pitch of the measurement points and the measurement range in the process of step S202 can be appropriately set to determine high-order components based on the measurement of the preceding substrate 5a in the first embodiment.

However, normally, even these high-order components can slightly vary for each substrate. Such a degree of difference may not be problematic in most cases in a normal imprint process. However, depending on the pattern to be transferred to the imprint material, even a slight change in high-order components may have an unignorable influence on the imprint result.

Although it is also possible to calculate high-order coefficients by increasing the measurement points in the manner of the fourth embodiment, fourth-order coefficients will require at least 15 measurement points, in fact, even more points when the use of the least squares method is taken into consideration. Furthermore, measurement points will need to be arranged in the peripheral portion of the substrate. Normally, pre-alignment measurement points are arranged to avoid the peripheral portion of the substrate. In such a case, it will be difficult to cope with the fourth embodiment.

Figure 10:
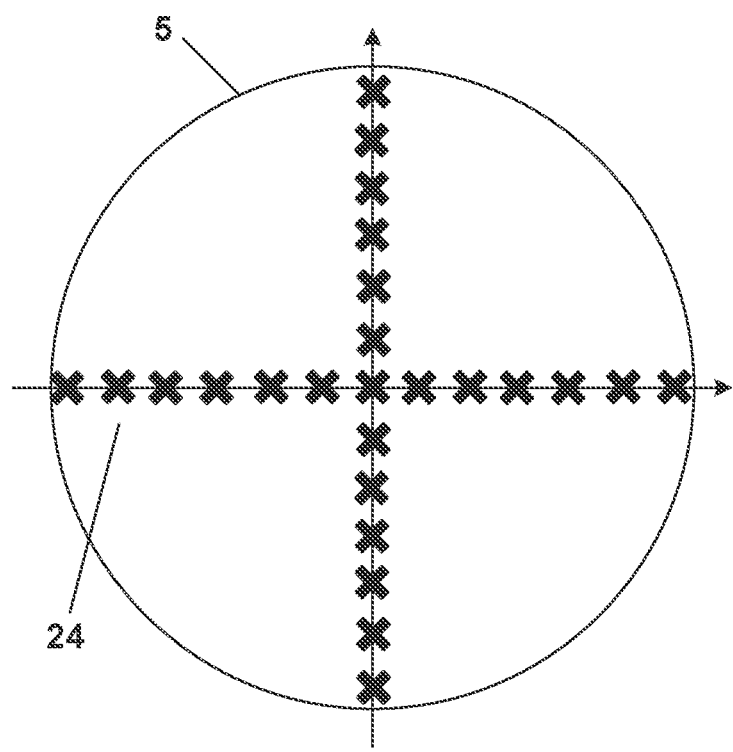
FIG. 10 is a view showing an example of the arrangement of measurement points.
Figure 10:
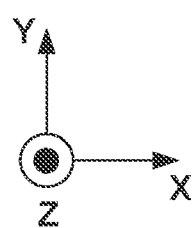

As described above, measurement by the substrate height sensor 8 can be performed during the movement of the substrate stage 6. Hence, the substrate stage 6 and the substrate height sensor 8 can be controlled so that the height of the surface of the substrate 5 will be measured from one end to the other end of the substrate 5 along the diameter direction of the substrate 5 while moving the substrate stage 6. For example, as shown in FIG. 10, a column can be measured for each of the X direction and the Y direction. In this example, it is possible to set 15 or more measurement points. However, since the measurement points are arranged in a single column, not all of the coefficients of the quartic surface can be calculated. The coefficients which cannot be calculated by this measurement method can be obtained from the measurement result of step S202. The measurement as exemplified in FIG. 10 can be performed on every substrate when the measurement accuracy of the tilt of the shot region is required to be strict. As a result, it will be possible to execute measurement more accurately while suppressing throughput degradation to a minimum. The measurement example raised here is merely an example, and the present invention is not limited to this. For example, various kinds of cases such as a case in which measurement is to be performed only in the X direction, a case in which measurement is to be performed only in the Y direction, a case in which measurement is to be also performed in a diagonal direction, and the like can be considered.

Figure 11:
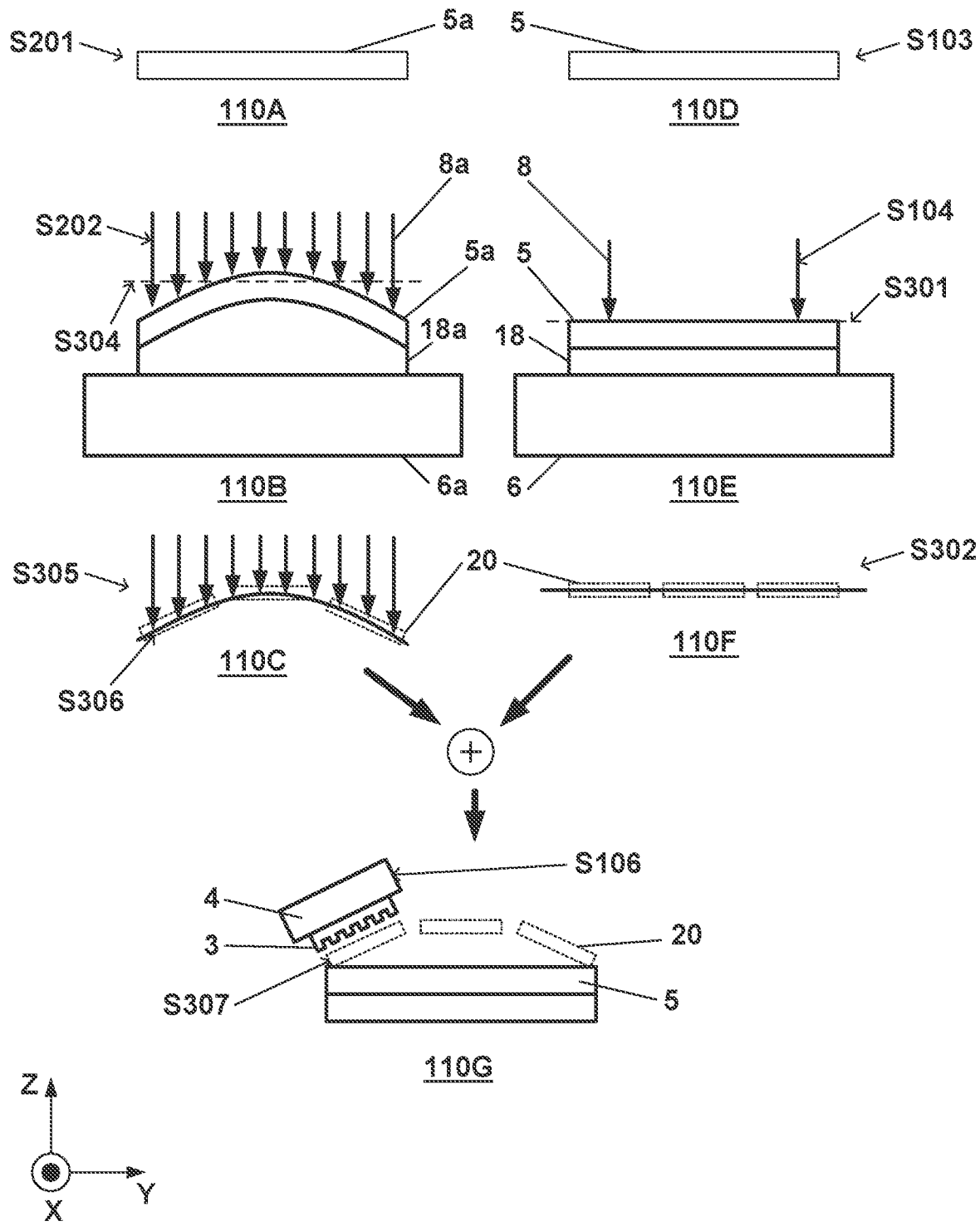
FIG. 11 is a view showing an example of a failure.

The sixth embodiment will be described hereinafter. The processes of steps S201 to S203 shown in FIG. 5 may be executed in another apparatus separate from an imprint apparatus 1. However, if the apparatus that measures the preceding substrate is different from the imprint apparatus 1, it may have a negative influence on the determination of the tilt of the shot region. FIG. 11 schematically shows an example of a failure. Assume that the shape of a substrate chuck 18a of the other apparatus is a quadratic shape as shown in a schematic view 110B, and the shape of a substrate chuck 18 of the imprint apparatus 1 is a linear shape as shown in a schematic view 110E. In this case, if processing according to the flowchart of FIG. 5 is executed, the tilt of the shot region obtained in step S307 will be a tilt value that has been influenced by the quadratic shape of the substrate chuck 18a of the other apparatus. In the example of FIG. 11, the tilt of the shot region which actually needs to be obtained is a tilt as shown in a schematic view 110F.

When the process for a preceding substrate 5a executed in step S202 and the process for a substrate 5 to be processed executed in step S104 are to be executed in the same apparatus, it is possible to calculate, as shown in FIG. 7, the tilt of the shot region without a problem even if the substrate chuck 18 has a quadratic shape. This is because the components caused by the shape of the chucking surface of the substrate chuck 18 will be the same in both the process for the preceding substrate 5a executed in step S202 and the process for the substrate 5 to be processed executed in step S104.

Figure 12:
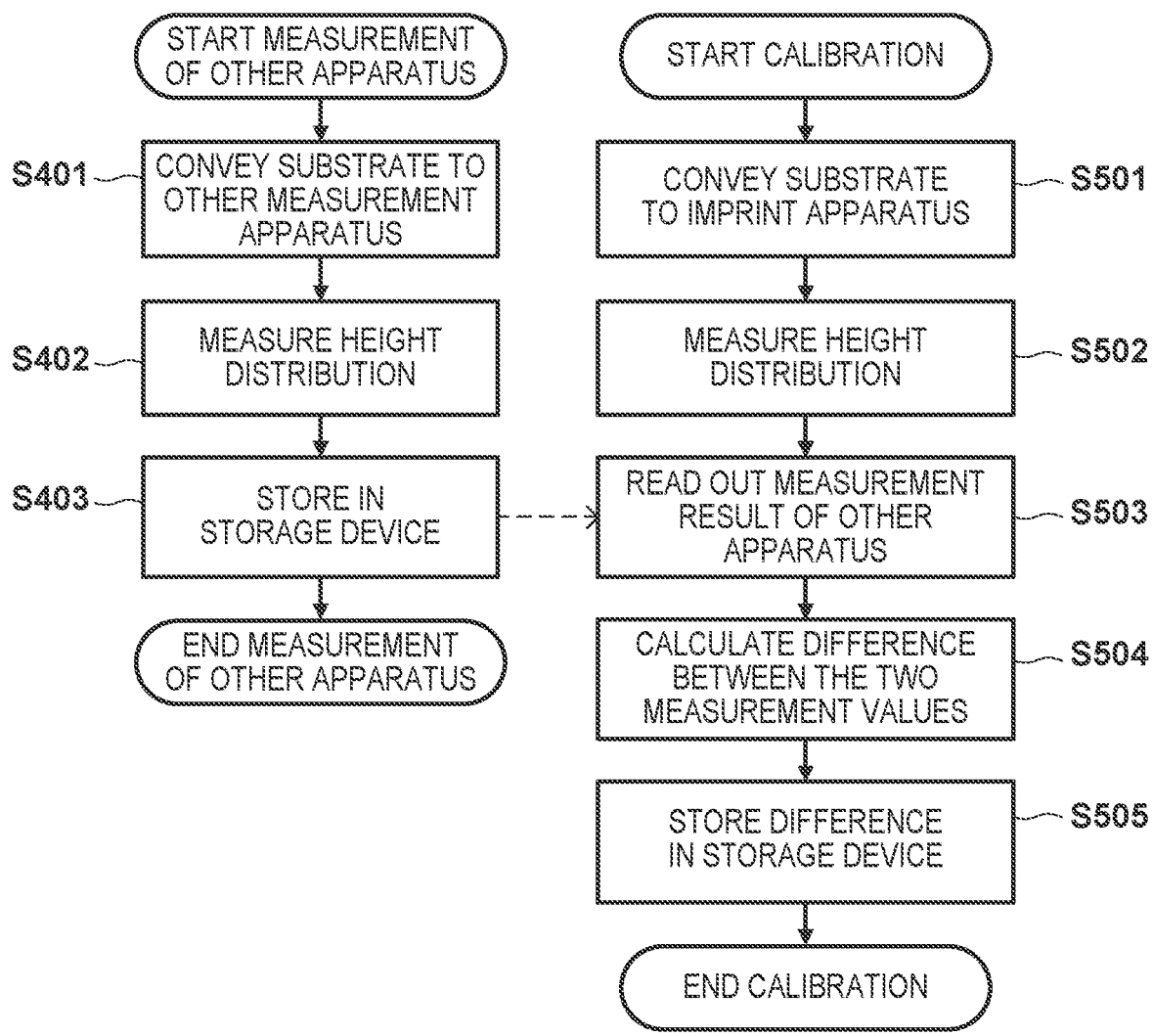
FIG. 12 is a flowchart showing the procedure of calibration processing.
Figure 13:
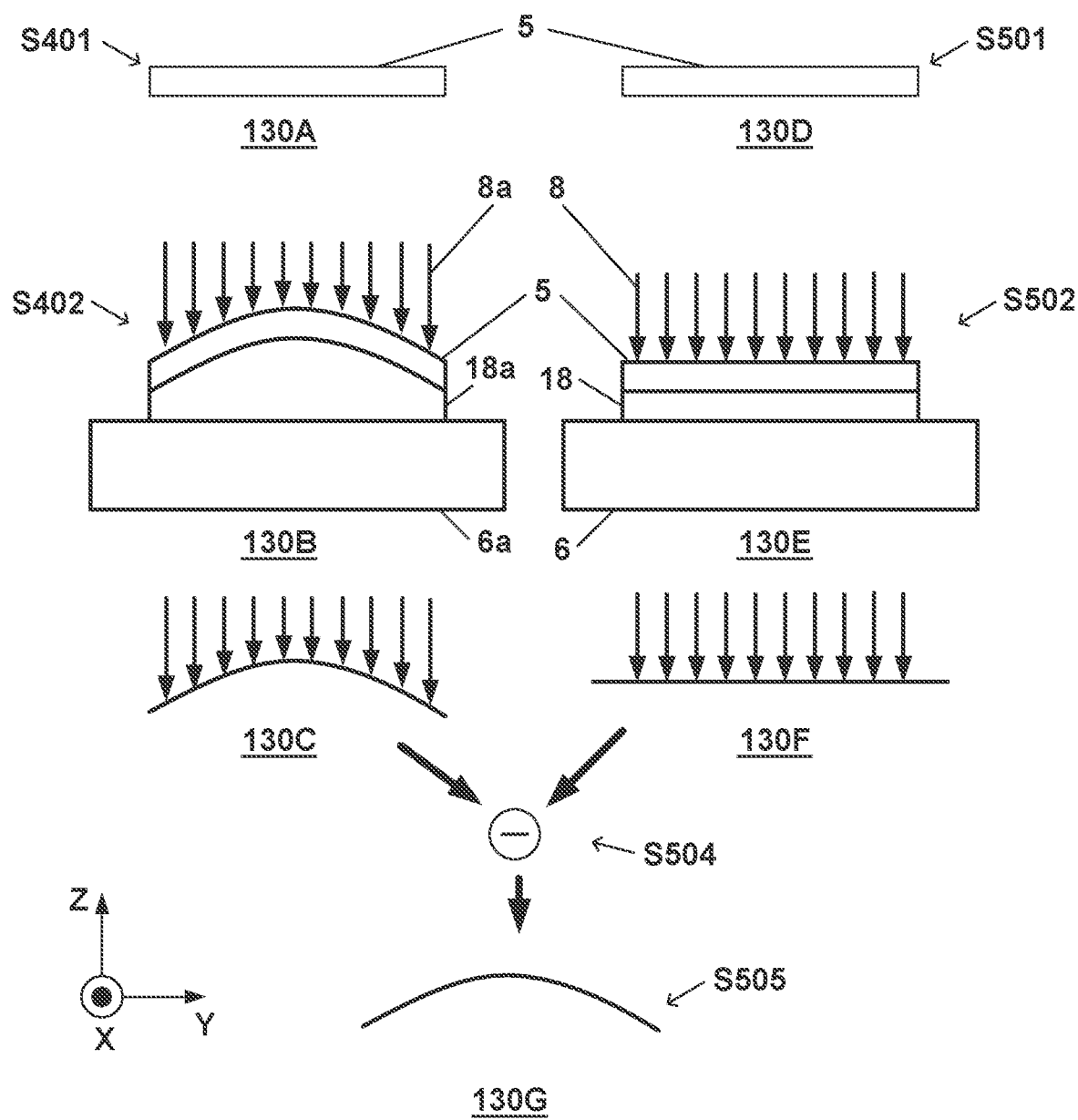
FIG. 13 is a view schematically showing main processes of the calibration processing shown in FIG. 12.

Hence, when the shape of the surface of the preceding substrate 5a is to be measured in another apparatus separate from the imprint apparatus 1, an apparatus factor, for example, a difference between the shape of the substrate chuck 18a of the other apparatus and the shape of the substrate chuck 18 of the imprint apparatus 1 can be measured in advance and be reflected in the calculation of the tilt of the shot region. FIG. 12 shows a flowchart showing the procedure of calibration processing according to the sixth embodiment. FIG. 13 schematically shows the main processes of the calibration processing. The basic concept is that the shape of the surface of the same substrate 5 will be measured by both the other apparatus and the imprint apparatus 1 and the difference between the measurement results will be calculated as an apparatus factor, that is, as a difference between the shapes of the respective substrate chucks.

In step S401 of FIG. 12, the substrate 5 is conveyed to the other apparatus and is held by the substrate chuck 18a. Although the substrate 5 may be any kind of substrate in this case, it is preferable to use an ultra-flat substrate. In step S402, the shape of the surface of the substrate 5 is measured in a manner similar to the process of step S202. This corresponds to a schematic view 130B, and a measurement result as shown in a schematic 130C is obtained. In step S403, the measurement result in a storage device in a manner similar to the process of step S203.

The shape of the surface of the same substrate 5 is also measured in the imprint apparatus 1. In step S501, the substrate 5 used in step S402 is conveyed to the imprint apparatus 1 and is held by the substrate chuck 18. In step S502, a substrate height sensor 8 is used to measure the shape of the surface of the substrate 5. This corresponds to a schematic view 130E, and a measurement result as shown in a schematic view 130F is obtained. Here, it is preferable for the arrangement of the measurement points in the measurement executed in step S502 to be the same as the arrangement of the measurement points in the measurement executed in step S402. Since the processing shown in FIG. 12 suffices to be executed only when another apparatus is introduced or when the substrate chuck of the other apparatus or the imprint apparatus is replaced, it is not necessary to consider the throughput.

In step S503, the measurement result (schematic view 130C) of the shape of the surface of the substrate 5 measured by the other apparatus and stored in the storage device in step S403 is read out from the storage device by the imprint apparatus 1. In step S504, a difference between the measurement result obtained in step S402 and the measurement result obtained in step S502 is calculated. Here, since the measurement points in the process of step S402 and the measurement points in the process of step S502 are at the same positions on the substrate 5, it is sufficient to calculate the difference between the measurement values of the same measurement points. The result of this difference is shown in a schematic view 130G and is stored in the storage device in step S505. If a plurality of other apparatuses are present, a plurality of storage areas can be prepared accordingly.

Note that although it has been described that it is preferable for the measurement points in step S402 and the measurement points in step S502 to be arranged in the same positions, it is also preferable for the positions of these measurement points to be the same as those of the measurement points in step S202. However, the present invention is not limited to this. If the positions of the measurement points are different, it will be sufficient to calculate the difference between measurement values of measurement points which are positioned near each other among the plurality of measurement points in step S402 and the plurality of measurement points in step S502. If the difference between the positions of the respective measurement points cannot be tolerated, the difference between an approximation function of the shape of the surface of the substrate obtained from the measurement result of step S402 and an approximation function of the shape of the surface of the substrate obtained from the measurement result of step S502 can be calculated.

Figure 14:
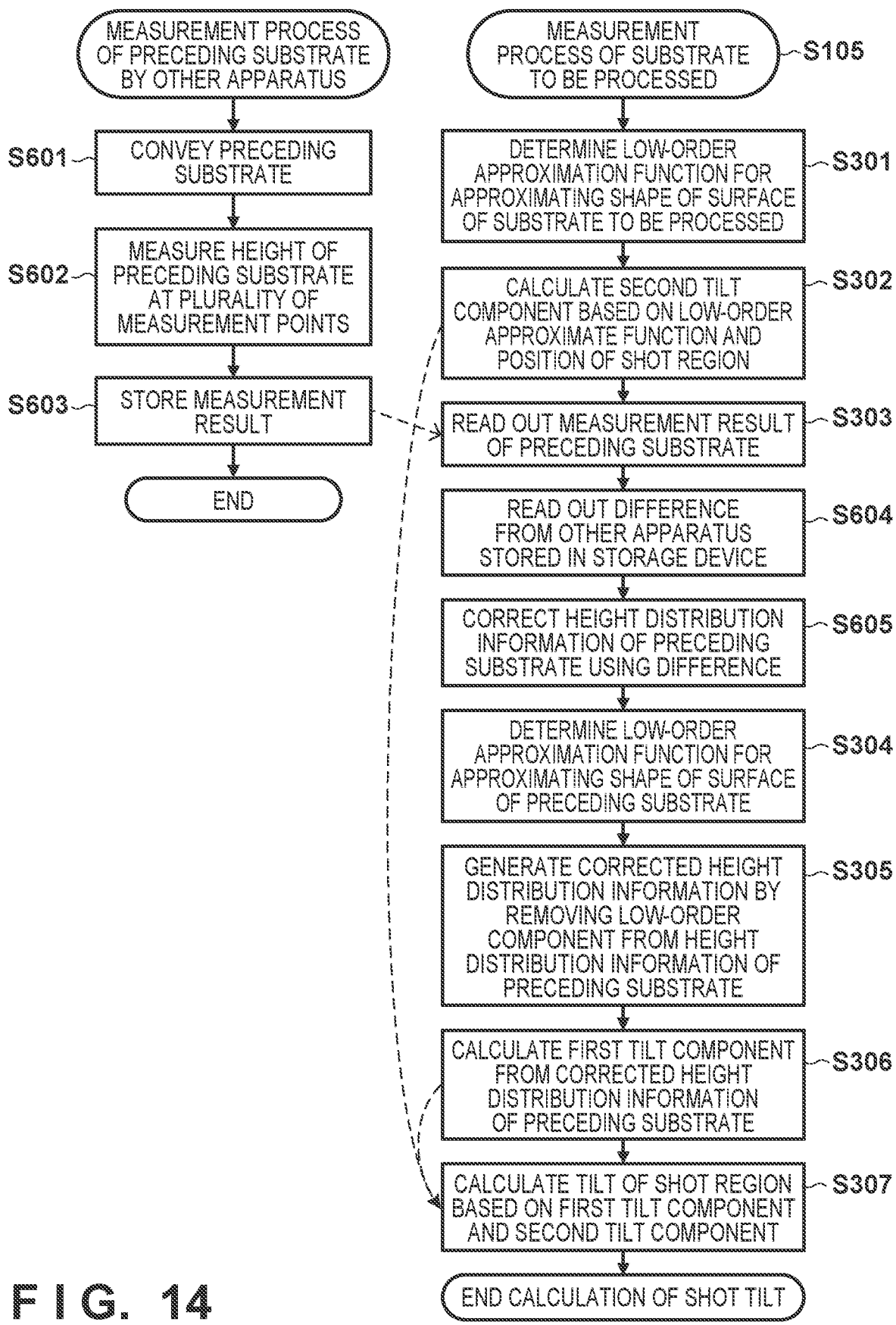
FIG. 14 is a flowchart of processing to be executed instead of processing according to the first embodiment shown in the flowchart of FIG. 5.
Figure 15:
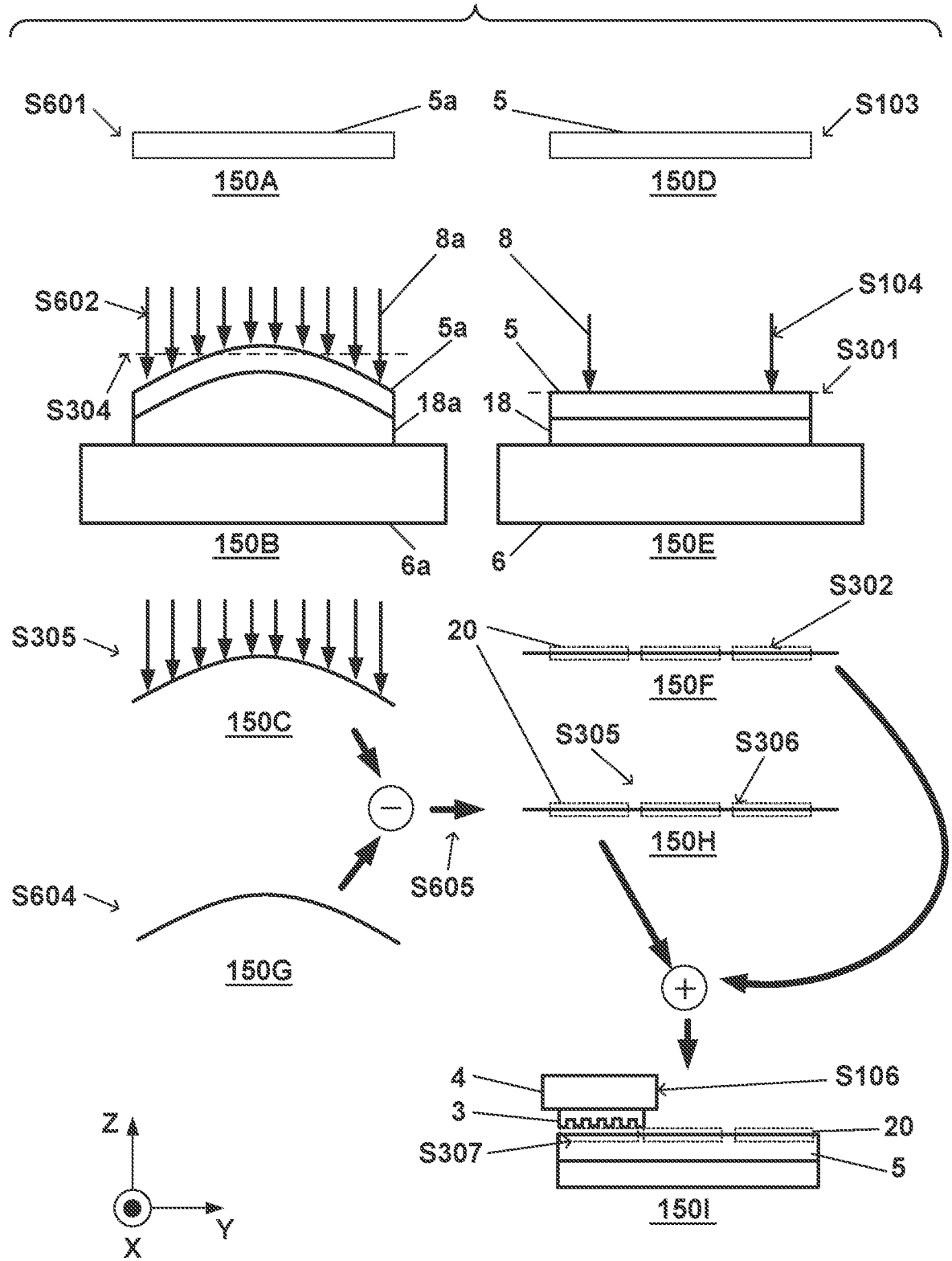
FIG. 15 is a view schematically showing the main processes of the procedure shown in the flowchart of FIG. 14.

A method of controlling the imprint process by using the difference obtained by the processing of the flowchart of FIG. 12 will be described next with reference to FIG. 14. FIG. 14 shows processing to be executed instead of the processing show in the flowchart of FIG. 5 according to the first embodiment. FIG. 15 schematically shows the change in the state of the imprint apparatus 1. The reference numerals denoting the processes shown in FIG. 15 correspond to the reference numerals denoting the processes shown in FIG. 14.

In step S601, the preceding substrate (first substrate) 5a can be conveyed by a substrate conveyance mechanism 12 to the substrate chuck 18a of the other apparatus and be held by the substrate chuck 18a. In step S602, the substrate height sensor of the other apparatus can be used to measure the height of the surface of the preceding substrate 5a by measuring a plurality (first number) of measurement points. As a result, the first height distribution information indicating the height distribution of the surface of the preceding substrate 5a can be obtained. This process is similar to the process of step S202 and is differs in the point that the measurement is performed by the other apparatus. In addition, as described above, it is preferable for the positions of the measurement points in this measurement to be the same as those in steps S402 and S502. In step S603, the measurement result obtained in step S602 is stored in the storage device.

Although the imprint process to be performed in the imprint apparatus 1 will be described next, a description of processes similar to those of FIG. 3 will be omitted and only process of step S105 will be described. The processes of steps S301 to S303 are in common with the processes of steps S301 to S303 in the flowchart of FIG. 5. In step S604, a controller 10 reads out the difference (schematic view 150G) stored in the storage device in step S505 of FIG. 12. This corresponds to the result of the schematic view 130G stored in the storage device. In step S605, the controller 10 uses the difference read out in step S604 to correct the first height distribution information read out from the storage device in step S303. More specifically, the controller 10 will subtract the difference (schematic view 150G) read out in step S604 from the first height distribution information (schematic view 150C) read out from the storage device in step S303. As a result, a schematic view 150H is obtained.

Although the process of step S304 is in common with FIG. 5, the target to be arithmetically processed is data obtained by the process of step S605, that is the result (schematic view 150H) obtained by removing the apparatus factor difference. The processes of steps S305 to S307 are in common with the processes of steps S305 to S307 in the flowchart of FIG. 5. As a result, as shown in a schematic view 150I, the tilt of the shot region to be processed is correctly calculated from the shape of the surface of the substrate 5. Although the substrate chuck and the substrate do not include linear components for the sake of descriptive convenience in the example of FIG. 15, there is no problem if these components are included as a matter of course.

The other apparatus described here may be a measuring apparatus that performs only a measurement operation or may be another imprint apparatus separate from the imprint apparatus which is to perform the processing shown in the flowchart of FIG. 3.

The pattern of a cured product formed using the imprint apparatus is used permanently for at least some of various kinds of articles or temporarily when manufacturing various kinds of articles. The articles are an electric circuit element, an optical element, a MEMS, a recording element, a sensor, a mold, and the like. Examples of the electric circuit element are volatile and nonvolatile semiconductor memories such as a DRAM, an SRAM, a flash memory, and an MRAM and semiconductor elements such as an LSI, a CCD, an image sensor, and an FPGA. The mold includes an imprint mold or the like.

The pattern of the cured product is directly used as at least some of the constituent members of the above-described articles or used temporarily as a resist mask. After etching or ion implantation is performed in the substrate processing step, the resist mask is removed.

Figure 16A:
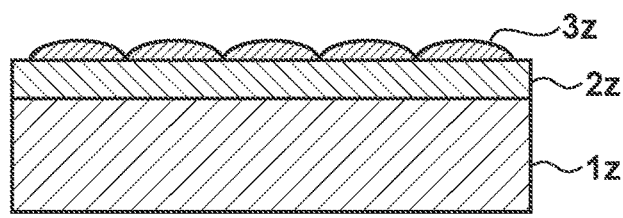
FIGS. 16A to 16F are views showing a method of manufacturing an article.

A method of manufacturing an article in which the imprint apparatus forms a pattern on a substrate, processes the substrate on which the pattern is formed, and manufactures an article from the processed substrate will be described next. As shown FIG. 16A, a substrate 1z such as a silicon wafer with a processed material 2z such as an insulator formed on the surface is prepared. Next, an imprint material 3z is applied to the surface of the processed material 2z by an inkjet method or the like. A state in which the imprint material 3z is applied as a plurality of droplets onto the substrate is shown here.

Figure 16B:
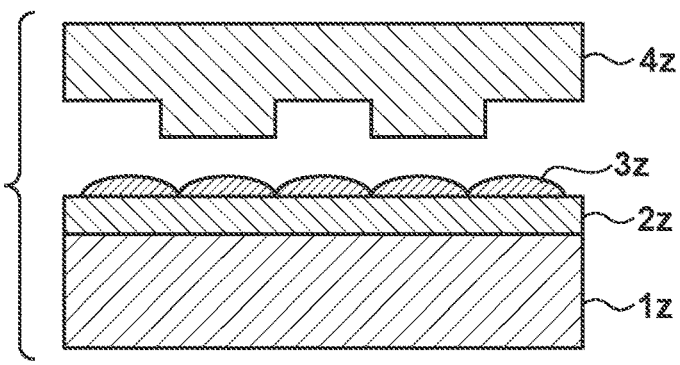
Figure 16C:
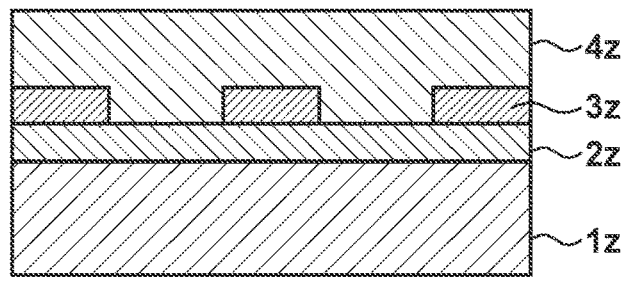

As shown in FIG. 16B, a side of a mold 4z for imprint with a concave-convex pattern is directed toward and made to face the imprint material 3z on the substrate. As shown FIG. 16C, the substrate 1z to which the imprint material 3z is applied is brought into contact with the mold 4z, and a pressure is applied. The gap between the mold 4z and the processed material 2z is filled with the imprint material 3z. In this state, when the imprint material 3z is irradiated with light as energy for curing via the mold 4z, the imprint material 3z is cured.

Figure 16D:
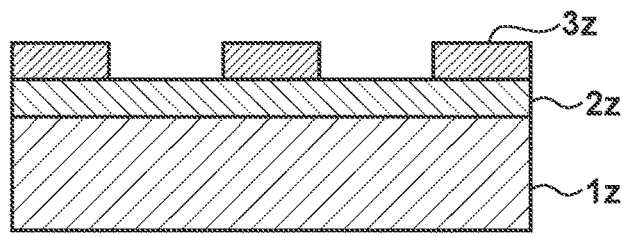

As shown in FIG. 16D, after the imprint material 3z is cured, the mold 4z is separated from the substrate 1z, and the pattern of the cured product of the imprint material 3z is formed on the substrate 1z. In the pattern of the cured product, the concave portion of the mold corresponds to the convex portion of the cured product, and the convex portion of the mold corresponds to the concave portion of the cured product. That is, the concave-convex pattern of the mold 4z is transferred to the imprint material 3z.

Figure 16E:
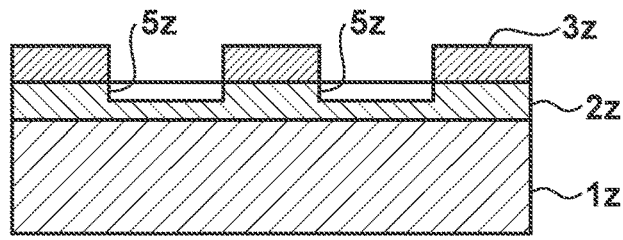
Figure 16F:
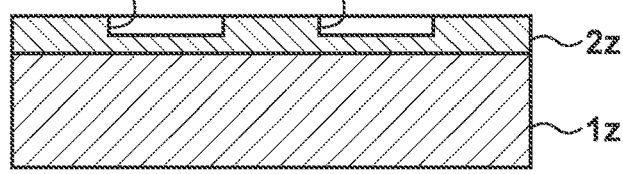

As shown in FIG. 16E, when etching is performed using the pattern of the cured product as an etching resistant mask, a portion of the surface of the processed material 2z where the cured product does not exist or remains thin is removed to form a groove 5z. As shown in FIG. 16F, when the pattern of the cured product is removed, an article with the grooves 5z formed in the surface of the processed material 2z can be obtained. Here, the pattern of the cured product is removed. However, instead of removing the pattern of the cured product after the process, it may be used as, for example, an interlayer dielectric film included in a semiconductor element or the like, that is, a constituent member of an article.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-071333, filed Apr. 20, 2021, which is hereby incorporated by reference herein in its entirety.

What is claimed is:

1. An imprint apparatus that forms a pattern on a substrate by contacting a mold having a pattern region with an imprint material on a shot region of the substrate, the imprint apparatus comprising:
    a substrate stage configured to hold the substrate;
    an imprint head configured to hold the mold;
    a dispenser configured to dispense the imprint material;
    a controller configured to obtain first height distribution information indicating a height distribution of a surface of a first substrate based on a measurement result obtained by measuring the first substrate and stored in a storage device; and
    a measuring device configured to obtain second height distribution information indicating a height distribution of a surface of a second substrate,
    wherein the controller is further configured to (i) cause the dispenser to dispense the imprint material onto the surface of the second substrate held by the substrate stage, (ii) control a relative orientation between the second substrate and the mold, in such a manner that a shot region of the second substrate and the pattern region of the mold are parallel, based on (ii.a) corrected height distribution information which is obtained by removing a first component that is an approximation function, of an order not more than a first predetermined order, for approximating the first height distribution information, from the first height distribution information which is obtained based on the measurement result stored in the storage device, and (ii.b) a second component which is an approximation function, of an order not more than a second predetermined order, for approximating the second height distribution information which is obtained by using the measuring device, and (iii) cause the mold held by the imprint head and the imprint material on the second substrate to come in contact with each other in a state that the relative orientation between the second substrate and the mold is controlled.

2. The apparatus according to claim 1, wherein the controller uses a least squares method to obtain the first component from the first height distribution information.

3. The apparatus according to claim 1, wherein the controller obtains an approximation function for approximating the first height distribution information and obtains the first component from the obtained approximation function for approximating the first height distribution information.

4. The apparatus according to claim 1, wherein the second component is a component not more than the second order.

5. The apparatus according to claim 1, wherein the second component is a linear component.

6. The apparatus according to claim 1, wherein the second component is a zeroth-order component.

7. The apparatus according to claim 1, wherein the first height distribution information includes height information related to each of a first number of measurement points on the surface of the first substrate,
    the second height distribution information includes height information related to each of a second number of measurement points on the surface of the second substrate, and
    the second number is less than the first number.

8. The apparatus according to claim 1, wherein the second predetermined order is equal to the first predetermined order.

9. The apparatus according to claim 1, wherein the measuring device is further used to obtain third height distribution information indicating a height distribution of a surface of a third substrate,
    the second component is a component not more than the second predetermined order and a component of an order lower than the second predetermined order and higher than a third predetermined order, and
    the controller controls an imprint process based on the corrected height distribution information, the second component, and a third component which is an approximation function, of an order not more than a third predetermined order, for approximating the third height distribution information.

10. The apparatus according to claim 9, wherein the controller controls the imprint process on the second substrate based on the corrected height distribution information, the second component, and the third component.

11. The apparatus according to claim 1, wherein the controller obtains, based on the second component, the corrected height distribution information, and a position of a shot region selected from a plurality of shot regions of the second substrate, a component of an order not more than the first order, and
    wherein the controller controls an imprint process on the selected shot region while controlling the selected shot region and the mold based on the component of the order not more than the first order.

12. The apparatus according to claim 11, wherein the controller obtains, based on the corrected height distribution information, a first tilt component of a shot region, of a plurality of shot regions of the first substrate, which is arranged at the same position as the selected shot region of the second substrate,
    wherein the controller obtains, based on the second component, a second tilt of the selected shot region of the second substrate, and
    wherein the controller uses the first tilt component and the second tilt component to obtain, as the component of the order not more than the first order, a tilt of the selected shot region of the second substrate.

* * * * *